(12) United States Patent
Zhang et al.

(10) Patent No.: US 11,552,975 B1
(45) Date of Patent: Jan. 10, 2023

(54) IOT DEVICE IDENTIFICATION WITH PACKET FLOW BEHAVIOR MACHINE LEARNING MODEL

(71) Applicant: Palo Alto Networks, Inc., Santa Clara, CA (US)

(72) Inventors: Jialiang Zhang, San Jose, CA (US); Ke Tian, San Jose, CA (US); Fan Zhang, Sunnyvale, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 0 days.

(21) Appl. No.: 17/511,376

(22) Filed: Oct. 26, 2021

(51) Int. Cl.
  *H04L 9/40* (2022.01)
  *H04L 67/12* (2022.01)

(52) U.S. Cl.
  CPC .......... *H04L 63/1425* (2013.01); *H04L 63/08* (2013.01); *H04L 67/12* (2013.01); *H04L 63/168* (2013.01)

(58) Field of Classification Search
  CPC .................. H04L 63/1425; H04L 63/08; H04L 63/168; H04L 67/12
  See application file for complete search history.

(56) References Cited

U.S. PATENT DOCUMENTS

| | | | |
|---|---|---|---|
| 6,877,146 B1 | 4/2005 | Teig | |
| 8,146,133 B2 | 3/2012 | Moon | |
| 8,159,966 B1 * | 4/2012 | Mabee | H04L 41/5022 370/395.2 |
| 8,331,229 B1 | 12/2012 | Hu | |
| 8,671,099 B2 | 3/2014 | Kapoor | |
| 8,683,598 B1 | 3/2014 | Cashin | |
| 8,850,588 B2 | 9/2014 | Kumar | |
| 8,874,550 B1 | 10/2014 | Soubramanien | |
| 8,891,528 B2 | 11/2014 | Moriarty | |
| 8,898,788 B1 | 11/2014 | Ashar | |
| 8,973,088 B1 | 3/2015 | Leung | |
| 9,324,119 B2 | 4/2016 | Singh | |
| 9,516,053 B1 | 12/2016 | Muddu | |

(Continued)

FOREIGN PATENT DOCUMENTS

| | | |
|---|---|---|
| CN | 102025577 | 7/2012 |
| CN | 107862468 | 3/2018 |

(Continued)

OTHER PUBLICATIONS

Author Unknown, Cisco Encrypted Traffic Analytics, Feb. 10, 2021.

(Continued)

*Primary Examiner* — Khoi V Le
(74) *Attorney, Agent, or Firm* — Van Pelt, Yi & James LLP

(57) ABSTRACT

Identifying Internet of Things (IoT) devices with packet flow behavior including by using machine learning models is disclosed. Information associated with a network communication of an IoT device is received. A determination of whether the IoT device has previously been classified is made. In response to determining that the IoT device has not previously been classified, a determination is made that a probability match for the IoT device against a behavior signature exceeds a threshold. Based at least in part on the probability match, a classification of the IoT device is provided to a security appliance configured to apply a policy to the IoT device.

25 Claims, 21 Drawing Sheets

(56) References Cited

U.S. PATENT DOCUMENTS

| | | |
|---|---|---|
| 9,548,987 B1 | 1/2017 | Poole |
| 9,584,536 B2 | 2/2017 | Nantel |
| 9,600,571 B2 | 3/2017 | Shaashua |
| 9,609,003 B1 | 3/2017 | Chmielewski |
| 9,661,011 B1 | 5/2017 | Van Horenbeeck |
| 9,692,784 B1 | 6/2017 | Nenov |
| 9,774,604 B2 | 9/2017 | Zou |
| 9,891,907 B2 | 2/2018 | Searle |
| 9,961,096 B1 | 5/2018 | Pierce |
| 9,984,344 B2 | 5/2018 | Singh |
| 10,038,700 B1 | 7/2018 | Duchin |
| 10,043,591 B1 | 8/2018 | Laborde |
| 10,122,747 B2 | 11/2018 | Mahaffey |
| 10,191,794 B2 | 1/2019 | Smith |
| 10,204,312 B2 | 2/2019 | Singh |
| 10,212,176 B2 | 2/2019 | Wang |
| 10,212,178 B2 | 2/2019 | Cheng |
| 10,229,269 B1 | 3/2019 | Patton |
| 10,237,875 B1 | 3/2019 | Romanov |
| 10,320,613 B1 | 6/2019 | Cam-Winget |
| 10,348,739 B2 | 7/2019 | Greenspan |
| 10,459,827 B1 | 10/2019 | Aghdaie |
| 10,489,361 B2 | 11/2019 | Sisk |
| 10,623,389 B2 | 4/2020 | Childress |
| 10,630,728 B2 | 4/2020 | Ghosh |
| 10,764,315 B1 | 9/2020 | Carroll |
| 10,887,306 B2 | 1/2021 | Gupta |
| 11,005,839 B1 | 5/2021 | Shahidzadeh |
| 11,070,568 B2 | 7/2021 | Ektare |
| 11,115,799 B1 | 9/2021 | Du |
| 11,455,641 B1 | 9/2022 | Shahidzadeh |
| 2004/0243835 A1 | 12/2004 | Terzis |
| 2006/0265397 A1 | 11/2006 | Bryan |
| 2008/0059536 A1 | 3/2008 | Brock |
| 2010/0284282 A1 | 11/2010 | Golic |
| 2012/0065749 A1 | 3/2012 | Hunter |
| 2012/0102543 A1 | 4/2012 | Kohli |
| 2012/0240185 A1 | 9/2012 | Kapoor |
| 2013/0173621 A1 | 7/2013 | Kapoor |
| 2013/0247190 A1 | 9/2013 | Spurlock |
| 2013/0305357 A1 | 11/2013 | Ayyagari |
| 2014/0006479 A1 | 1/2014 | Maloo |
| 2014/0244834 A1 | 8/2014 | Guedalia |
| 2014/0281912 A1 | 9/2014 | Doi |
| 2014/0325670 A1 | 10/2014 | Singh |
| 2014/0337862 A1 | 11/2014 | Valencia |
| 2015/0039513 A1* | 2/2015 | Adjaoute ............... G06Q 20/12 705/44 |
| 2015/0055623 A1 | 2/2015 | Li |
| 2015/0229654 A1 | 8/2015 | Perier |
| 2015/0271192 A1 | 9/2015 | Crowley |
| 2015/0293954 A1 | 10/2015 | Hsiao |
| 2015/0295945 A1 | 10/2015 | Canzanese, Jr. |
| 2016/0028750 A1 | 1/2016 | Di Pietro |
| 2016/0036819 A1 | 2/2016 | Zehavi |
| 2016/0048984 A1 | 2/2016 | Frigo |
| 2016/0119372 A1 | 4/2016 | Borlick |
| 2016/0128043 A1 | 5/2016 | Shuman |
| 2016/0173446 A1 | 6/2016 | Nantel |
| 2016/0173495 A1 | 6/2016 | Joo |
| 2016/0182497 A1 | 6/2016 | Smith |
| 2016/0212099 A1 | 7/2016 | Zou |
| 2016/0218949 A1 | 7/2016 | Dasgupta |
| 2016/0267406 A1 | 9/2016 | Bodo |
| 2016/0267408 A1 | 9/2016 | Singh |
| 2016/0277435 A1 | 9/2016 | Salajegheh |
| 2016/0301707 A1 | 10/2016 | Cheng |
| 2016/0301717 A1 | 10/2016 | Dotan |
| 2016/0337127 A1 | 11/2016 | Schultz |
| 2016/0352685 A1 | 12/2016 | Park |
| 2016/0366141 A1 | 12/2016 | Smith |
| 2016/0366181 A1 | 12/2016 | Smith |
| 2017/0006028 A1 | 1/2017 | Tunnell |
| 2017/0006135 A1 | 1/2017 | Siebel |
| 2017/0011406 A1 | 1/2017 | Tunnell et al. |
| 2017/0013005 A1 | 1/2017 | Galula |
| 2017/0055913 A1 | 3/2017 | Bandyopadhyay |
| 2017/0063774 A1 | 3/2017 | Chen |
| 2017/0093915 A1 | 3/2017 | Ellis |
| 2017/0118237 A1 | 4/2017 | Devi Reddy |
| 2017/0118240 A1 | 4/2017 | Devi Reddy |
| 2017/0124660 A1 | 5/2017 | Srivastava |
| 2017/0126704 A1 | 5/2017 | Nandha Premnath |
| 2017/0149813 A1 | 5/2017 | Wright |
| 2017/0180380 A1 | 6/2017 | Bagasra |
| 2017/0180399 A1 | 6/2017 | Sukhomlinov |
| 2017/0188242 A1 | 6/2017 | Ghosh |
| 2017/0200061 A1 | 7/2017 | Julian |
| 2017/0232300 A1 | 8/2017 | Tran |
| 2017/0235585 A1 | 8/2017 | Gupta |
| 2017/0235783 A1 | 8/2017 | Chen |
| 2017/0244737 A1 | 8/2017 | Kuperman |
| 2017/0251007 A1 | 8/2017 | Fujisawa |
| 2017/0272554 A1 | 9/2017 | Kwan |
| 2017/0279685 A1 | 9/2017 | Mota |
| 2017/0289184 A1 | 10/2017 | Subramanian |
| 2017/0331671 A1 | 11/2017 | Olsson |
| 2017/0331906 A1 | 11/2017 | Choi |
| 2017/0339178 A1 | 11/2017 | Mahaffey |
| 2017/0344407 A1 | 11/2017 | Jeon |
| 2017/0346677 A1 | 11/2017 | Suryanarayana |
| 2018/0007058 A1 | 1/2018 | Zou |
| 2018/0012227 A1 | 1/2018 | Tunnell |
| 2018/0018684 A1 | 1/2018 | Orr |
| 2018/0027006 A1 | 1/2018 | Zimmermann |
| 2018/0078843 A1 | 3/2018 | Tran |
| 2018/0115574 A1 | 4/2018 | Ridley |
| 2018/0117446 A1 | 5/2018 | Tran |
| 2018/0117447 A1 | 5/2018 | Tran |
| 2018/0139227 A1 | 5/2018 | Martin |
| 2018/0144139 A1 | 5/2018 | Cheng |
| 2018/0191729 A1 | 7/2018 | Whittle |
| 2018/0191746 A1 | 7/2018 | De Knijf |
| 2018/0191848 A1 | 7/2018 | Bhattacharya |
| 2018/0205793 A1 | 7/2018 | Loeb |
| 2018/0212768 A1 | 7/2018 | Kawashima |
| 2018/0234519 A1 | 8/2018 | Boyapalle |
| 2018/0248902 A1 | 8/2018 | Dãnilã-Dumitrescu |
| 2018/0255084 A1 | 9/2018 | Kotinas |
| 2018/0264347 A1 | 9/2018 | Tran |
| 2018/0285234 A1 | 10/2018 | Degaonkar |
| 2018/0293387 A1 | 10/2018 | Bar-El |
| 2018/0295148 A1 | 10/2018 | Mayorgo |
| 2018/0349598 A1 | 12/2018 | Harel |
| 2018/0349612 A1 | 12/2018 | Harel |
| 2018/0357556 A1 | 12/2018 | Rai |
| 2018/0375887 A1 | 12/2018 | Dezent |
| 2019/0019249 A1 | 1/2019 | Bhattacharjee |
| 2019/0081961 A1 | 3/2019 | Bansal |
| 2019/0098028 A1 | 3/2019 | Ektare |
| 2019/0098058 A1 | 3/2019 | Ikegami |
| 2019/0109717 A1 | 4/2019 | Reddy |
| 2019/0121978 A1 | 4/2019 | Kraemer |
| 2019/0138512 A1 | 5/2019 | Pourmohammad |
| 2019/0182278 A1 | 6/2019 | Das |
| 2019/0268305 A1 | 8/2019 | Xu |
| 2019/0349426 A1* | 11/2019 | Smith ................... H04L 63/123 |
| 2019/0361917 A1 | 11/2019 | Tran |
| 2019/0373472 A1 | 12/2019 | Smith |
| 2019/0387399 A1* | 12/2019 | Weinberg ............ H04L 63/1441 |
| 2020/0076846 A1 | 3/2020 | Pandian |
| 2020/0076853 A1 | 3/2020 | Pandian |
| 2020/0117690 A1 | 4/2020 | Tran |
| 2020/0156654 A1 | 5/2020 | Boss |
| 2020/0162278 A1 | 5/2020 | Delaney |
| 2020/0177485 A1* | 6/2020 | Shurtleff ................. H04L 43/08 |
| 2020/0177579 A1 | 6/2020 | Mangalvedkar |
| 2020/0213146 A1 | 7/2020 | Kodam |
| 2020/0409957 A1 | 12/2020 | Zhang |

FOREIGN PATENT DOCUMENTS

| | | |
|---|---|---|
| CN | 108650133 | 10/2018 |
| CN | 107135093 | 5/2020 |

(56) References Cited

FOREIGN PATENT DOCUMENTS

| EP | 3136297 | 3/2017 |
|---|---|---|
| JP | 2018513467 | 5/2018 |
| WO | 2019218874 | 11/2019 |

OTHER PUBLICATIONS

Blackstock et al., IoT Interoperability: A Hub-based Approach, 2014, IEEE International Conference on the Internet of Things (IOT), pp. 80-84.
Fredj et al., A Scalable IoT Service Search Based on Clustering and Aggregation, 2013 IEEE International Conference on Green Computing and Communication and IEEE Internet of Things and IEEE Cyber, Physical and Social Computing, pp. 1-8.
International Application No. PCT/US2016/025661, International Search Report and Written Opinion dated Jul. 7, 2016.
Li et al., A Distributed Consensus Algorithm for Decision Making in Service-Oriented Internet of Things, Old Dominion University, ODU Digital Commons, 2014.
Liu et al., A Lightweight Anomaly Mining Algorithm in the Internet of Things, 2014 IEEE 5th International Conference an Software Engineering and Service Science, 2014, pp. 1142-1145.
Miloslavskaya et al., Ensuring Information Security for Internet of Things, 2017, IEEE 5th International Conference of Future Internet of Things and Cloud, pp. 62-69.
Nguyen et al., A Software-Defined Model for IoT Clusters: Enabling Applications on Demand, Faculty of Engineering and IT, University of Technology Sydney, Australia, IEEE Xplore, Apr. 23, 2018.
Sivanathan et al., Classifying IoT Devices in Smart Environments Using Network Traffic Characteristics, IEEE, TMC, No. 8, pp. 1745-1759, Aug. 2018.
Sivanathan et al., Detecting Behavioral Change of IoT Devices Using Clustering-Based Network Traffic Modeling, IEEE LCN 2019, Mar. 30, 2020.
Sivanathan et al., Inferring IoT Device Types from Network Behavior Using Unsupervised Clustering, IEEE ICN 2019, Oct. 2019.
Al-Shaer et al., Design and Implementation of Firewall Policy Advisor Tools, 2002.
Al-Shaer et al., Firewall Policy Advisor for Anomaly Discovery and Rule Editing, Integrated Network Management VIII, 2003.
Martin et al., Requirements and Recommendations for CWE Compatibility and CWE Effectiveness, Version 1.0, Jul. 28, 2011.
National Electrical Manufacturers Association, Manufacturer Disclosure Statement for Medical Device Security, HIMSS/NEMA Standard HN Jan. 2013, 2013.
Charyyev et al., Locality-Sensitive IoT Network Traffic Fingerprinting for Device Identification, IEEE Internet of Things Journal, 2020, vol. 8, No. 3, pp. 1272-1281.
Du et al., A Lightweight Flow Feature-Based IoT Device Identification Scheme, Security and Communication Networks, 2022.
Zhao et al., A Few-Shot Learning Based Approach to IoT Traffic Classification, IEEE Communications Letters, 2021.
Arash Fasihi, Rule Based Inference and Action Selection Based on Monitoring Data in IoT, Dec. 1, 2015.
Cramer et al., Detecting Anomalies in Device Event Data in the IoT, Proceedings of the 3td International Conference an Internet of Things, Big Data and Security, Mar. 21, 2018, pp. 52-62.
Midi et al., Kalis—A System for Knowledge-driven Adaptable Intrusion Detection for the Internet of Things, 2017 IEEE 37th International Conference on Distributed Computing Systems, pp. 656-666.
Charu C. Aggarwal, Outlier Analysis, Retrieved from the Internet, URL: https://web.archive.org/web/20130210212057/http://charuaggarwal.net/outlierbook.pdf.
Hirofumi Nakakoji, et al., "Study of the Incident Tendency Detection Method on Frequency Analysis," Technical Report of IEICE, Japan, The Institute of Electronics, Information and Communication Engineers (IEICE), Jul. 14, 2005, vol. 105, No. 193, pp. 83-88.

* cited by examiner

```
{
    "evtType": "evt_connect",
    "iotDevid": "AA:BB:CC:01:02:03",
    "profileType": "unknown",
    "tenantid": "customerbeta1",
    "timestamp": 1591646393584",
    "evtContent": {
      "hostname": "IMAGING001",
      "hostname_src": "DHCP",
      "roles": " ",
      "monitored": true,
      "ip": "10.14.176.208",
      "ip_src": "dhcp",
      "dhcp_option_55": "1,3,28,6,15,12"
    },
    "@timestamp": "2020-06-08T20:08:55.944Z",
    "routerid": "44454C4C480010348046B2C04F4A5633",
    "profileId": "n/a",
    "profileCategory": "n/a",
    "profileVertical": "n/a",
}
```

FIG. 2D

```
{
"sessionCount": "2",
"evtType": "evt_session",
"evtContent": {
"sessions": [
  {
  "remoteURL": "10.226.138.12",
  "remoteIPAddr": "10.226.138.12",
  "remotePort": 9997,
  "ipProtocol": 6,
  "localIPAddr": "10.98.1.139",
  "localPort": 59970,
  "appName": "splunk",
  "txBytes": 59442,
  "rxBytes": 2383,
  "txPkts": 74,
  "rxPkts": 37,
  "tcpFlags": "SAPECF",
  "durationUsec": 30588831,
  "ts": "1591646859236",
  "profileType": "IoT",
  "profileConfidenceScore": 99,
  "profileId": "CT Scanner CT750HD",
  "profileVertical": "Medical",
  "profileCategory": "CT Scanner",
  "geoLocation": "Internal"
  },
  {
  "remoteURL": "www.google.com",
  "remoteIPAddr": "216.58.194.164",
  "remotePort": 443,
  "ipProtocol": 6,
  "localIPAddr": "10.98.1.139",
  "localPort": 59969,
  "appName": "web-browsing",
  "txBytes": 384,
  "rxBytes": 186,
  "txPkts": 6,
  "rxPkts": 3,
  "tcpFlags": "SAECF",
  "durationUsec": 559685,
  "ts": "1591646859244",
  "profileType": "IoT",
  "profileConfidenceLevel": 99,
  "profileId": "CT Scanner CT750HD",
  "profileVertical": "Medical",
  "profileCategory": "CT Scanner",
  "geoLocation": "Internal"
  },
"iotDevid": "XX:YY:ZZ:01:02:03",
"@timestamp": "2020-06-08T20:10:31.728Z",
"routerid": "4C4C4544003838108042B8C04F363133",
"tenantid": "customerbeta1",
"timestamp": "1591647028789"
}
```

FIG. 2E

```
Code = Access-Request (1)
ID = x
Length = xx
Request Authenticator
    Attributes:
    Calling-Station-Id = "00:12:67:11:22:33"
    Framed-IP-Address = "10.10.10.1"
    NAS-IP-Address = <zingbox sensor IP>
```

FIG. 4A

```
Code = Access-Request (1)
ID = x
Length = xx
Request Authenticator
    Attributes:
    Calling-Station-Id = "00:12:67:11:22:33"
    Framed-IP-Address = "10.10.10.1"
    NAS-IP-Address = <zingbox sensor IP>
    Device-Profile = "Panasonic Panboard"
    Device-Category = "Interactive Whiteboard"
    Device-Type = "Office"
    Device-Vendor = "Panasonic Corporation"
```

FIG. 4B

```
Code = Access-Request (1)
ID = x
Length = xx
Request Authenticator
    Attributes:
    Calling-Station-Id = "00:12:67:11:22:33"
    Framed-IP-Address = "10.10.10.1"
    NAS-IP-Address = <zingbox sensor IP>
    Device-Profile = "Panasonic Panboard"
    Device-Category = "Interactive Whiteboard"
    Device-Type = "Office"
    Device-Vendor = "Panasonic Corporation"
    Device-Model = "KX-B430"
    Device-OS-Group = "Linux"
    Device-OS-Ver = "3.16"
```

FIG. 4C

```
# Allow DICOM App between GE & Fujitsu X-Ray Devices and PACS Storage
Server
permit udp host 10.8.200.70 host 192.12.19.20 eq 2762
permit udp host 192.12.19.20 host 10.8.200.70 eq 2762
permit udp host 10.8.200.70 host 209.81.9.7 eq 2762
permit udp host 209.81.9.7 host 10.8.200.70 eq 2762
permit tcp host 10.9.0.249 host 10.8.200.70 eq 9100
permit tcp host 10.9.0.249 host 10.8.200.70 eq 135

# Allow NTP, DHCP Protocols for X-Ray Devices
permit udp host 10.8.200.70 host 158.247.20.1
permit udp host 158.247.20.1 host 10.8.200.70
permit udp host 10.8.200.70 host 199.240.130.1
permit udp host 199.240.130.1 host 10.8.200.70
permit udp host 10.8.200.70 host 130.202.101.6
permit udp host 130.202.101.6 host 10.8.200.70
permit tcp host 10.8.200.70 host 10.9.0.249
permit tcp host 10.9.0.249 host 10.8.200.70
permit tcp host 10.9.0.249 host 10.8.200.70 eq 21
permit udp host 10.8.200.70 host 207.200.81.113
permit udp host 207.200.81.113 host 10.8.200.70
permit udp host 10.8.200.70 host 192.73.48.1
permit udp host 192.73.48.1 host 10.8.200.70
permit icmp host 10.8.200.70 host 10.9.0.249
permit udp host 10.8.200.70 host 10.9.0.249
permit udp host 10.9.0.249 host 10.8.200.70
permit tcp host 10.9.0.249 host 10.8.200.70 eq 1400
permit tcp host 10.9.0.249 host 10.8.200.70 eq 5060
```

FIG. 7A

```
# Allow DICOM App between X-Ray Devices and PACS Storage Server
permit DICOM-App host GE-XRay-Device host PACS-Storage-Server
permit DICOM-App host Fujitsu-XRay-Device host PACS-Storage-Server

# Allow NTP, DHCP Protocols
 permit NTP host GE-XRay-Device
 permit NTP host Fujitsu-XRay-Device
 permit DHCP host GE-XRay-Device
 permit DHCP host Fujitsu-XRay-Device
```

Profiles > Siemens Building Technology Device >

| | | | | | |
|---|---|---|---|---|---|
| Items per page | 25 ∨ | 1 -1 of 1 rows | | 1 > | of 1 page ∨ | bacnet (1)  [Usage] [Low] (Allow Application) — 1002

| No. | Source Profile | Application | Destination Profile → | # of IP Addresses | # of Selected IP | Usage |
|---|---|---|---|---|---|---|
| 1 | Siemens Building Tec. | bacnet | - | 1 | - | Low | dhcp (1)  [Usage] [Medium] (Allow Application)

| No. | Source Profile | Application ← | Destination Profile → | # of IP Addresses | # of Selected IP | Usage |
|---|---|---|---|---|---|---|
| 1 | Siemens Building Tec. | dhcp | - | 3 | - | Medium |

| | | | | | |
|---|---|---|---|---|---|
| Items per page | 25 ∨ | 1-1 of 1 rows | | 1 > | of page ∨ |

FIG. 10

```
========================
Training Data
========================
     oui  prot  dport  plen0  plen1  plen2   t0     t1     t2  label
0   6935     6     21     21     26     22  0.0  0.477  0.934      1
1   6935     6     21     20     25     23  0.0  0.467  0.843      1
2   6935     6     21     23     28     27  0.0  0.503  0.743      1
3   6935     6     21     17     30     27  0.0  0.676  1.264      1
4   6935     6     21     23     29     27  0.0  0.130  0.818      1
5 584949     6  61909   1460    224   1460  0.0  0.100  0.100      0
6   2275     6    443     28   1346    391  0.0  0.001  0.003      0
7   2275     6  50226      4    140    120  0.0  0.001  0.100      0
8 8697858   17  44005     12     12     12  0.0  4.113  0.873      0
9 8697858   17  44005     12     12     12  0.0  7.074  9.043      0
========================
```

FIG. 13A

```
========================
Coefficient and Intercept
========================
[[ 0.00102632  0.01809086 -0.20320841  0.06207634  0.03832148  0.0634156
   0.          0.00136707  0.00282446]]
[0.00304261]
========================
```

FIG. 13B

IOT DEVICE IDENTIFICATION WITH PACKET FLOW BEHAVIOR MACHINE LEARNING MODEL

BACKGROUND OF THE INVENTION

Nefarious individuals attempt to compromise computer systems in a variety of ways. As one example, such individuals may embed or otherwise include malicious software ("malware") in email attachments and transmit or cause the malware to be transmitted to unsuspecting users. When executed, the malware compromises the victim's computer and can perform additional nefarious tasks (e.g., exfiltrating sensitive data, propagating to other systems, etc.). A variety of approaches can be used to harden computers against such and other compromises. Unfortunately, existing approaches to protecting computers are not necessarily suitable in all computing environments. Further, malware authors continually adapt their techniques to evade detection, and an ongoing need exists for improved techniques to detect malware and prevent its harm in a variety of situations.

BRIEF DESCRIPTION OF THE DRAWINGS

Various embodiments of the invention are disclosed in the following detailed description and the accompanying drawings.

FIG. 2D illustrates an example of a device discovery event.

FIG. 2E illustrates an example of a session event.

FIGS. 4A-4C illustrate examples of RADIUS messages sent by an IoT server to a AAA server on behalf of an IoT device in various embodiments.

FIGS. 7A and 7B illustrate example firewall rules

FIG. 8-10 illustrate portions of example interfaces.

FIG. 13A illustrates training data.

FIG. 13B illustrates a result of training a model using the dataset shown in FIG. 13A.

DETAILED DESCRIPTION

Figure 1:
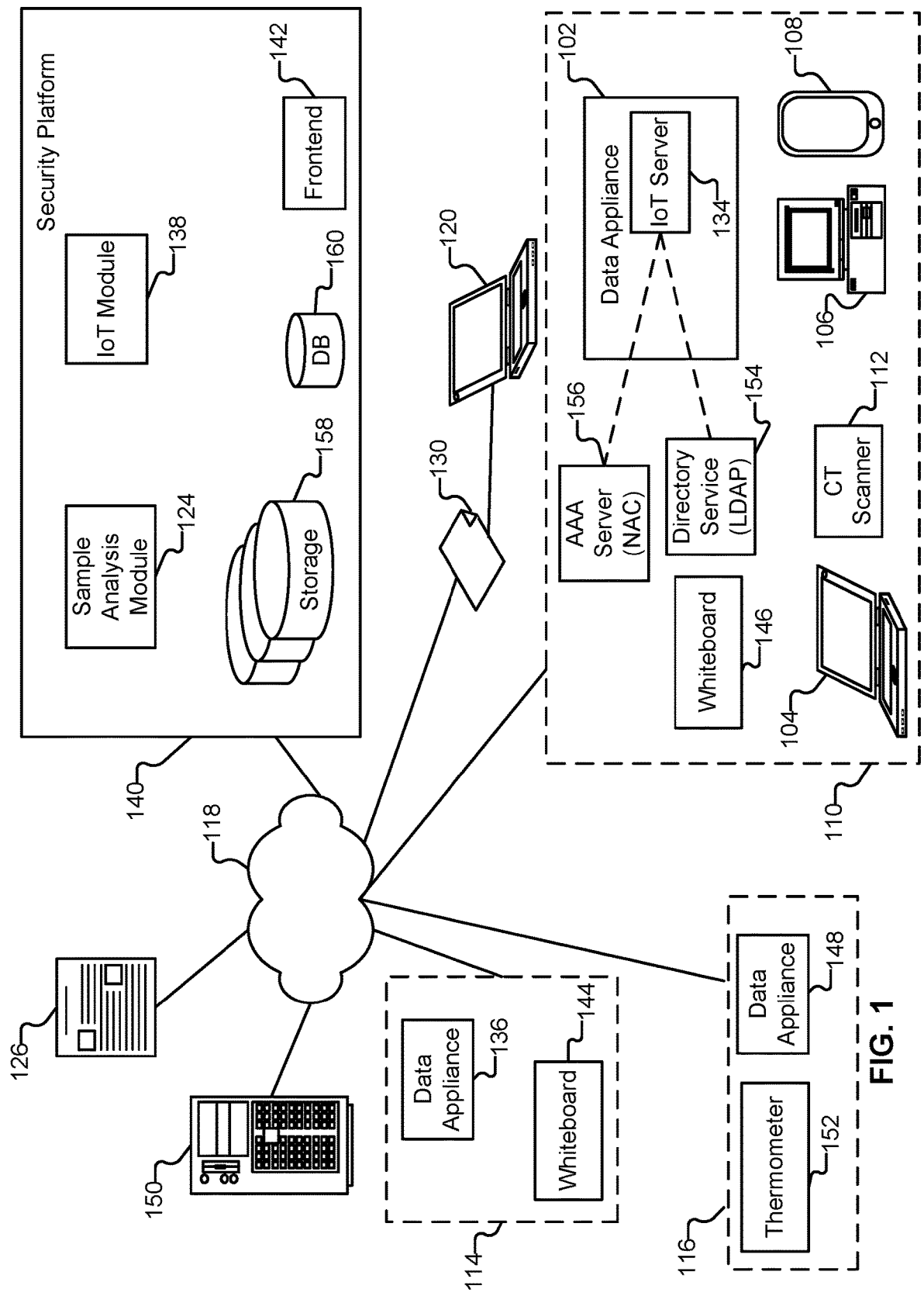
FIG. 1 illustrates an example of an environment in which malicious activity is detected and its harm reduced.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

I. Overview

A firewall generally protects networks from unauthorized access while permitting authorized communications to pass through the firewall. A firewall is typically a device, a set of devices, or software executed on a device that provides a firewall function for network access. For example, a firewall can be integrated into operating systems of devices (e.g., computers, smart phones, or other types of network communication capable devices). A firewall can also be integrated into or executed as one or more software applications on various types of devices, such as computer servers, gateways, network/routing devices (e.g., network routers), and data appliances (e.g., security appliances or other types of special purpose devices), and in various implementations, certain operations can be implemented in special purpose hardware, such as an ASIC or FPGA.

Firewalls typically deny or permit network transmission based on a set of rules. These sets of rules are often referred to as policies (e.g., network policies or network security policies). For example, a firewall can filter inbound traffic by applying a set of rules or policies to prevent unwanted outside traffic from reaching protected devices. A firewall can also filter outbound traffic by applying a set of rules or policies (e.g., allow, block, monitor, notify or log, and/or other actions can be specified in firewall rules or firewall policies, which can be triggered based on various criteria, such as are described herein). A firewall can also filter local network (e.g., intranet) traffic by similarly applying a set of rules or policies.

Security devices (e.g., security appliances, security gateways, security services, and/or other security devices) can include various security functions (e.g., firewall, anti-malware, intrusion prevention/detection, Data Loss Prevention (DLP), and/or other security functions), networking functions (e.g., routing, Quality of Service (QoS), workload balancing of network related resources, and/or other networking functions), and/or other functions. For example, routing functions can be based on source information (e.g., IP address and port), destination information (e.g., IP address and port), and protocol information.

A basic packet filtering firewall filters network communication traffic by inspecting individual packets transmitted over a network (e.g., packet filtering firewalls or first generation firewalls, which are stateless packet filtering firewalls). Stateless packet filtering firewalls typically inspect the individual packets themselves and apply rules based on the inspected packets (e.g., using a combination of a packet's source and destination address information, protocol information, and a port number).

Application firewalls can also perform application layer filtering (e.g., application layer filtering firewalls or second generation firewalls, which work on the application level of the TCP/IP stack). Application layer filtering firewalls or application firewalls can generally identify certain applications and protocols (e.g., web browsing using HyperText Transfer Protocol (HTTP), a Domain Name System (DNS) request, a file transfer using File Transfer Protocol (FTP), and various other types of applications and other protocols, such as Telnet, DHCP, TCP, UDP, and TFTP (GSS)). For example, application firewalls can block unauthorized protocols that attempt to communicate over a standard port (e.g., an unauthorized/out of policy protocol attempting to sneak through by using a non-standard port for that protocol can generally be identified using application firewalls).

Stateful firewalls can also perform state-based packet inspection in which each packet is examined within the context of a series of packets associated with that network transmission's flow of packets. This firewall technique is generally referred to as a stateful packet inspection as it maintains records of all connections passing through the firewall and is able to determine whether a packet is the start of a new connection, a part of an existing connection, or is an invalid packet. For example, the state of a connection can itself be one of the criteria that triggers a rule within a policy.

Advanced or next generation firewalls can perform stateless and stateful packet filtering and application layer filtering as discussed above. Next generation firewalls can also perform additional firewall techniques. For example, certain newer firewalls sometimes referred to as advanced or next generation firewalls can also identify users and content (e.g., next generation firewalls). In particular, certain next generation firewalls are expanding the list of applications that these firewalls can automatically identify to thousands of applications. Examples of such next generation firewalls are commercially available from Palo Alto Networks, Inc. (e.g., Palo Alto Networks' PA Series firewalls). For example, Palo Alto Networks' next generation firewalls enable enterprises to identify and control applications, users, and content—not just ports, IP addresses, and packets—using various identification technologies, such as the following: APP-ID for accurate application identification, User-ID for user identification (e.g., by user or user group), Content-ID for real-time content scanning (e.g., controlling web surfing and limiting data and file transfers), and Device-ID (e.g., for IoT device type identification). These identification technologies allow enterprises to securely enable application usage using business-relevant concepts, instead of following the traditional approach offered by traditional port-blocking firewalls. Also, special purpose hardware for next generation firewalls (implemented, for example, as dedicated appliances) generally provides higher performance levels for application inspection than software executed on general purpose hardware (e.g., such as security appliances provided by Palo Alto Networks, Inc., which use dedicated, function specific processing that is tightly integrated with a single-pass software engine to maximize network throughput while minimizing latency).

Advanced or next generation firewalls can also be implemented using virtualized firewalls. Examples of such next generation firewalls are commercially available from Palo Alto Networks, Inc. (e.g., Palo Alto Networks' VM Series firewalls, which support various commercial virtualized environments, including, for example, VMware® ESXi™ and NSX™, Citrix® Netscaler SDX™, KVM/OpenStack (Centos/RHEL, Ubuntu®), and Amazon Web Services (AWS)). For example, virtualized firewalls can support similar or the exact same next-generation firewall and advanced threat prevention features available in physical form factor appliances, allowing enterprises to safely enable applications flowing into, and across their private, public, and hybrid cloud computing environments. Automation features such as VM monitoring, dynamic address groups, and a REST-based API allow enterprises to proactively monitor VM changes dynamically feeding that context into security policies, thereby eliminating the policy lag that may occur when VMs change.

II. Example Environment

FIG. 1 illustrates an example of an environment in which malicious activity is detected and its harm reduced. In the example shown in FIG. 1, client devices 104-108 are a laptop computer, a desktop computer, and a tablet (respectively) present in an enterprise network 110 of a hospital (also referred to as "Acme Hospital"). Data appliance 102 is configured to enforce policies regarding communications between client devices, such as client devices 104 and 106, and nodes outside of enterprise network 110 (e.g., reachable via external network 118).

Examples of such policies include ones governing traffic shaping, quality of service, and routing of traffic. Other examples of policies include security policies such as ones requiring the scanning for threats in incoming (and/or outgoing) email attachments, web site content, files exchanged through instant messaging programs, and/or other file transfers. In some embodiments, data appliance 102 is also configured to enforce policies with respect to traffic that stays within enterprise network 110.

Network 110 also includes a directory service 154 and an Authentication, Authorization, and Accounting (AAA) server 156. In the example shown in FIG. 1, directory service 154 (also referred to as an identity provider or domain controller) makes use of the Lightweight Directory Access Protocol (LDAP) or other appropriate protocols. Directory service 154 is configured to manage user identity and credential information. One example of directory service 154 is a Microsoft Active Directory server. Other types of systems can also be used instead of an Active Directory server, such as a Kerberos-based system, and the techniques described herein adapted accordingly. In the example shown in FIG. 1, AAA server 156 is a network admission control (NAC) server. AAA server 156 is configured to authenticate wired, wireless, and VPN users and devices to a network, evaluate and remediate a device for policy compliance before permitting access to the network, differentiate access based on roles, and then audit and report on who is on the network. One example of AAA server 156 is a Cisco Identity Services Engine (ISE) server that makes use of the Remote Authentication Dial-In User Service (RADIUS). Other types of AAA servers can be used in conjunction with the techniques described herein, including ones that use protocols other than RADIUS.

In various embodiments, data appliance 102 is configured to listen to communications (e.g., passively monitor messages) to/from directory service 154 and/or AAA server 156. In various embodiments, data appliance 102 is configured to communicate with (i.e., actively communicate messages with) directory service 154 and/or AAA server 156. In various embodiments, data appliance 102 is configured to communicate with an orchestrator (not pictured) that communicates with (e.g., actively communicates messages with) various network elements such as directory service 154 and/or AAA server 156. Other types of servers can also be included in network 110 and can communicate with data appliance 102 as applicable, and directory service 154 and/or AAA server 156 can also be omitted from network 110 in various embodiments.

While depicted in FIG. 1 as having a single data appliance 102, a given network environment (e.g., network 110) can include multiple embodiments of data appliances, whether operating individually or in concert. Similarly, while the term "network" is generally referred to herein for simplicity in the singular (e.g., as "network 110"), the techniques described herein can be deployed in a variety of network environments of various sizes and topologies, comprising various mixes of networking technologies (e.g., virtual and physical), using various networking protocols (e.g., TCP and UDP) and infrastructure (e.g., switches and routers) across various network layers, as applicable.

Data appliance 102 can be configured to work in cooperation with a remote security platform 140. Security platform 140 can provide a variety of services, including performing static and dynamic analysis on malware samples (e.g., via sample analysis module 124), and providing a list of signatures of known-malicious files, domains, etc., to data appliances, such as data appliance 102 as part of a subscription. As will be described in more detail below, security platform 140 can also provide information (e.g., via IoT module 138) associated with the discovery, classification, management, etc., of IoT devices present within a network such as network 110. In various embodiments, signatures, results of analysis, and/or additional information (e.g., pertaining to samples, applications, domains, etc.) is stored in database 160. In various embodiments, security platform 140 comprises one or more dedicated commercially available hardware servers (e.g., having multi-core processor(s), 32G+ of RAM, gigabit network interface adaptor(s), and hard drive(s)) running typical server-class operating systems (e.g., Linux). Security platform 140 can be implemented across a scalable infrastructure comprising multiple such servers, solid state drives or other storage 158, and/or other applicable high-performance hardware. Security platform 140 can comprise several distributed components, including components provided by one or more third parties. For example, portions or all of security platform 140 can be implemented using the Amazon Elastic Compute Cloud (EC2) and/or Amazon Simple Storage Service (S3). Further, as with data appliance 102, whenever security platform 140 is referred to as performing a task, such as storing data or processing data, it is to be understood that a sub-component or multiple sub-components of security platform 140 (whether individually or in cooperation with third party components) may cooperate to perform that task. As examples, security platform 140 can perform static/dynamic analysis (e.g., via sample analysis module 124) and/or IoT device functionality (e.g., via IoT module 138) in cooperation with one or more virtual machine (VM) servers. An example of a virtual machine server is a physical machine comprising commercially available server-class hardware (e.g., a multi-core processor, 32+ Gigabytes of RAM, and one or more Gigabit network interface adapters) that runs commercially available virtualization software, such as VMware ESXi, Citrix XenServer, or Microsoft Hyper-V. In some embodiments, the virtual machine server is omitted. Further, a virtual machine server may be under the control of the same entity that administers security platform 140, but may also be provided by a third party. As one example, the virtual machine server can rely on EC2, with the remainder portions of security platform 140 provided by dedicated hardware owned by and under the control of the operator of security platform 140.

Figure 2A:
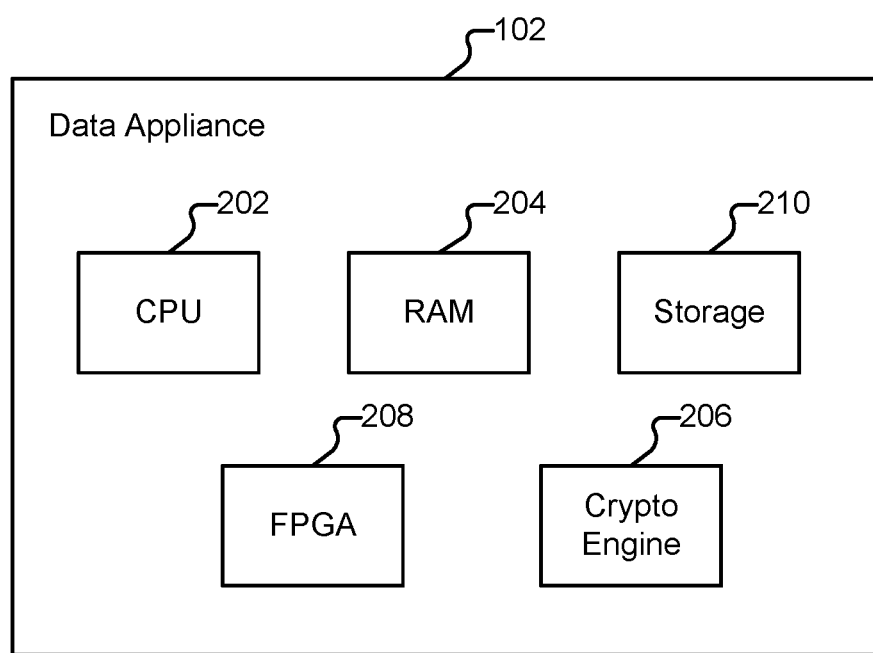
FIG. 2A illustrates an embodiment of a data appliance.

An embodiment of a data appliance is shown in FIG. 2A. The example shown is a representation of physical components that are included in data appliance 102, in various embodiments. Specifically, data appliance 102 includes a high performance multi-core Central Processing Unit (CPU) 202 and Random Access Memory (RAM) 204. Data appliance 102 also includes a storage 210 (such as one or more hard disks or solid state storage units). In various embodiments, data appliance 102 stores (whether in RAM 204, storage 210, and/or other appropriate locations) information used in monitoring enterprise network 110 and implementing disclosed techniques. Examples of such information include application identifiers, content identifiers, user identifiers, requested URLs, IP address mappings, policy and other configuration information, signatures, hostname/URL categorization information, malware profiles, machine learning models, IoT device classification information, etc. Data appliance 102 can also include one or more optional hardware accelerators. For example, data appliance 102 can include a cryptographic engine 206 configured to perform encryption and decryption operations, and one or more Field Programmable Gate Arrays (FPGAs) 208 configured to perform matching, act as network processors, and/or perform other tasks.

Functionality described herein as being performed by data appliance 102 can be provided/implemented in a variety of ways. For example, data appliance 102 can be a dedicated device or set of devices. A given network environment may include multiple data appliances, each of which may be configured to provide services to a particular portion or portions of a network, may cooperate to provide services to a particular portion or portions of a network, etc. The functionality provided by data appliance 102 can also be integrated into or executed as software on a general purpose computer, a computer server, a gateway, and/or a network/routing device. In some embodiments, at least some functionality described as being provided by data appliance 102 is instead (or in addition) provided to a client device (e.g., client device 104 or client device 106) by software executing on the client device. Functionality described herein as being performed by data appliance 102 can also be performed at least partially by or in cooperation with security platform 140, and/or functionality described herein as being performed by security platform 140 can also be performed at least partially by or in cooperation with data appliance 102, as applicable. As one example, various functionality described as being performed by IoT module 138 can be performed by embodiments of IoT server 134.

Whenever data appliance 102 is described as performing a task, a single component, a subset of components, or all components of data appliance 102 may cooperate to perform the task. Similarly, whenever a component of data appliance 102 is described as performing a task, a subcomponent may perform the task and/or the component may perform the task in conjunction with other components. In various embodiments, portions of data appliance 102 are provided by one or more third parties. Depending on factors such as the amount of computing resources available to data appliance 102, various logical components and/or features of data appliance 102 may be omitted and the techniques described herein adapted accordingly. Similarly, additional logical components/features can be included in embodiments of data appliance 102 as applicable. One example of a component included in data appliance 102 in various embodiments is an application identification engine which is configured to identify an application (e.g., using various application signatures for identifying applications based on packet flow analysis). For example, the application identification engine can determine what type of traffic a session involves, such as Web Browsing—Social Networking; Web Browsing—News; SSH; and so on. Another example of a component included in data appliance 102 in various embodiments is an IoT server 134, described in more detail below. IoT server 134 can take a variety of forms, including as a standalone server (or set of servers), whether physical or virtualized, and can also be collocated with/incorporated into data appliance 102 as applicable (e.g., as shown in FIG. 1).

Figure 2B:
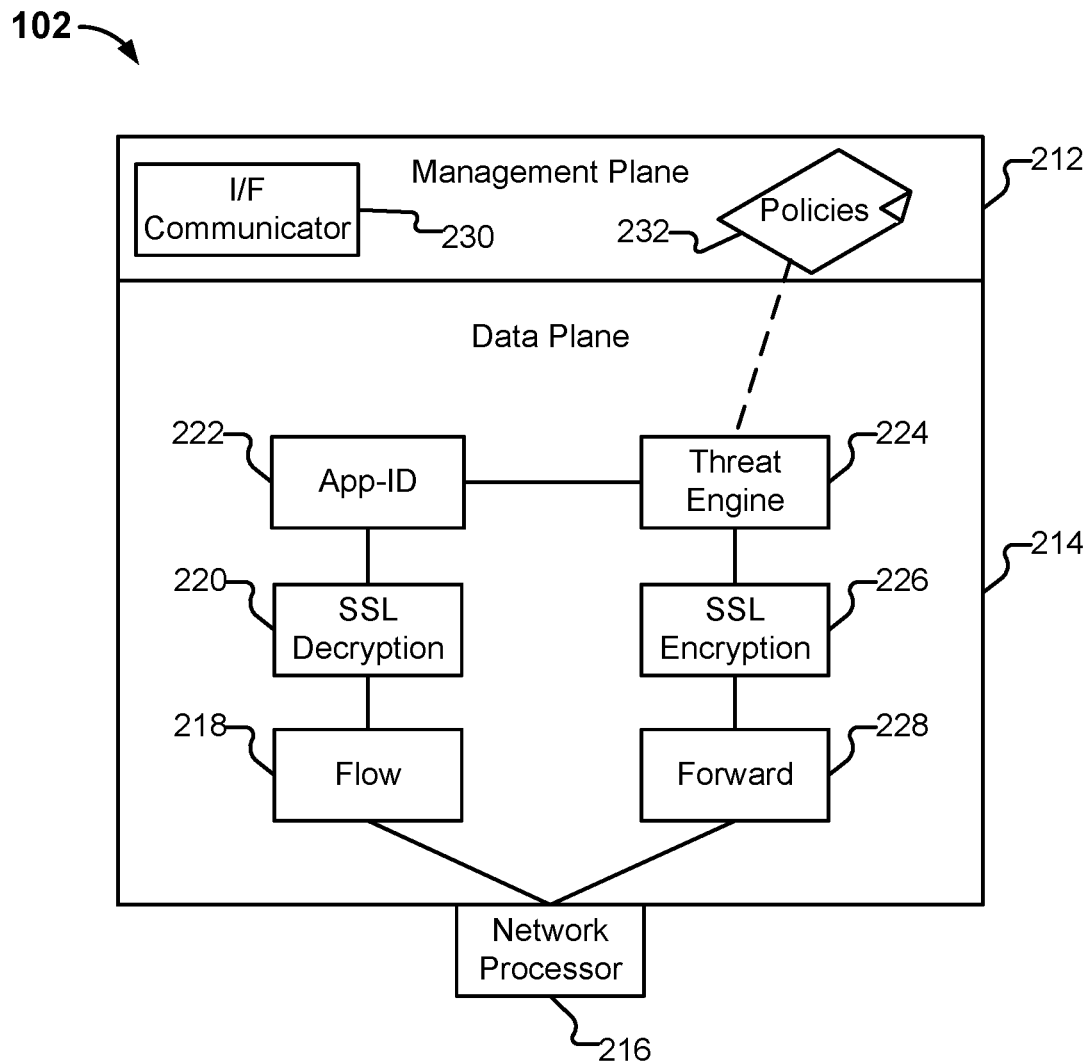
FIG. 2B is a functional diagram of logical components of an embodiment of a data appliance.

FIG. 2B is a functional diagram of logical components of an embodiment of a data appliance. The example shown is a representation of logical components that can be included in data appliance 102 in various embodiments. Unless otherwise specified, various logical components of data appliance 102 are generally implementable in a variety of ways, including as a set of one or more scripts (e.g., written in Java, python, etc., as applicable).

As shown, data appliance 102 comprises a firewall, and includes a management plane 212 and a data plane 214. The management plane is responsible for managing user interactions, such as by providing a user interface for configuring policies and viewing log data. The data plane is responsible for managing data, such as by performing packet processing and session handling.

Network processor 216 is configured to receive packets from client devices, such as client device 108, and provide them to data plane 214 for processing. Whenever flow module 218 identifies packets as being part of a new session, it creates a new session flow. Subsequent packets will be identified as belonging to the session based on a flow lookup. If applicable, SSL decryption is applied by SSL decryption engine 220. Otherwise, processing by SSL decryption engine 220 is omitted. Decryption engine 220 can help data appliance 102 inspect and control SSL/TLS and SSH encrypted traffic, and thus help to stop threats that might otherwise remain hidden in encrypted traffic. Decryption engine 220 can also help prevent sensitive content from leaving enterprise network 110. Decryption can be controlled (e.g., enabled or disabled) selectively based on parameters such as: URL category, traffic source, traffic destination, user, user group, and port. In addition to decryption policies (e.g., that specify which sessions to decrypt), decryption profiles can be assigned to control various options for sessions controlled by the policy. For example, the use of specific cipher suites and encryption protocol versions can be required.

Application identification (APP-ID) engine 222 is configured to determine what type of traffic a session involves. As one example, application identification engine 222 can recognize a GET request in received data and conclude that the session requires an HTTP decoder. In some cases, e.g., a web browsing session, the identified application can change, and such changes will be noted by data appliance 102. For example, a user may initially browse to a corporate Wiki (classified based on the URL visited as "Web Browsing—Productivity") and then subsequently browse to a social networking site (classified based on the URL visited as "Web Browsing—Social Networking"). Different types of protocols have corresponding decoders.

Based on the determination made by application identification engine 222, the packets are sent, by threat engine 224, to an appropriate decoder configured to assemble packets (which may be received out of order) into the correct order, perform tokenization, and extract out information. Threat engine 224 also performs signature matching to determine what should happen to the packet. As needed, SSL encryption engine 226 can re-encrypt decrypted data. Packets are forwarded using a forward module 228 for transmission (e.g., to a destination).

As also shown in FIG. 2B, policies 232 are received and stored in management plane 212. Policies can include one or more rules, which can be specified using domain and/or host/server names, and rules can apply one or more signatures or other matching criteria or heuristics, such as for security policy enforcement for subscriber/IP flows based on various extracted parameters/information from monitored session traffic flows. An interface (I/F) communicator 230 is provided for management communications (e.g., via (REST) APIs, messages, or network protocol communications or other communication mechanisms). Policies 232 can also include policies for managing communications involving IoT devices.

III. IOT Device Discovery and Identification

Returning to FIG. 1, suppose that a malicious individual (e.g., using system 120) has created malware 130. The malicious individual hopes that vulnerable client devices will execute a copy of malware 130, compromising the client device, and causing the client device to become a bot in a botnet. The compromised client device can then be instructed to perform tasks (e.g., cryptocurrency mining, participating in denial of service attacks, and propagating to other vulnerable client devices) and to report information or otherwise exfiltrate data to an external entity (e.g., command and control (C&C) server 150), as well as to receive instructions from C&C server 150, as applicable.

Some client devices depicted in FIG. 1 are commodity computing devices typically used within an enterprise organization. For example, client devices 104, 106, and 108 each execute typical operating systems (e.g., macOS, Windows, Linux, Android, etc.). Such commodity computing devices are often provisioned and maintained by administrators (e.g., as company-issued laptops, desktops, and tablets, respectively) and often operated in conjunction with user accounts (e.g., managed by a directory service provider (also referred to as a domain controller) configured with user identity and credential information). As one example, an employee Alice might be issued laptop 104 which she uses to access her ACME-related email and perform various ACME-related tasks. Other types of client devices (referred to herein generally as Internet of Things or IoT devices) are increasingly also present in networks and are often "unmanaged" by the IT department. Some such devices (e.g., teleconferencing devices) may be found across a variety of different types of enterprises (e.g., as IoT whiteboards 144 and 146). Such devices may also be vertical specific. For example, infusion pumps and computerized tomography scanners (e.g., CT scanner 112) are examples of IoT devices that may be found within a healthcare enterprise network (e.g., network 110), and robotic arms are an example of devices that may be found in a manufacturing enterprise network. Further, consumer-oriented IoT devices (e.g., cameras) may also be present in an enterprise network. As with commodity computing devices, IoT devices present within a network may communicate with resources that are both internal or external to such networks (or both, as applicable).

As with commodity computing devices, IoT devices are a target of nefarious individuals. Unfortunately, the presence of IoT devices in a network can present several unique security/administrative challenges. IoT devices are often low-power devices or special purpose devices and are often deployed without the knowledge of network administrators. Even where known to such administrators, it may not be possible to install endpoint protection software or agents on IoT devices. IoT devices may be managed by and communicate solely/directly with third party cloud infrastructure (e.g., with industrial thermometer 152 communicating directly with cloud infrastructure 126) using proprietary (or otherwise non-standard) protocols. This can confound attempts to monitor network traffic in and out of such devices to make decisions about when a threat or attack is happening against the device. Further, some IoT devices (e.g., in a healthcare environment) are mission critical (e.g., a network connected surgical system). Unfortunately, compromise of an IoT device (e.g., by malware 130) or the misapplication of security policies against traffic associated with an IoT device can have potentially catastrophic implications. Using techniques described herein, the security of heterogeneous networks that include IoT devices can be improved and the harms posed to such networks can be reduced.

In various embodiments, data appliance 102 includes an IoT server 134. IoT server 134 is configured to identify IoT devices within a network (e.g., network 110), in some embodiments, in cooperation with IoT module 138 of security platform 140. Such identification can be used, e.g., by data appliance 102, to help make and enforce policies regarding traffic associated with IoT devices, and to enhance the functionality of other elements of network 110 (e.g., providing contextual information to AAA 156). In various embodiments, IoT server 134 incorporates one or more network sensors configured to passively sniff/monitor traffic. One example way to provide such network sensor functionality is as a tap interface or switch mirror port. Other approaches to monitoring traffic can also be used (in addition or instead) as applicable.

Figure 2C:
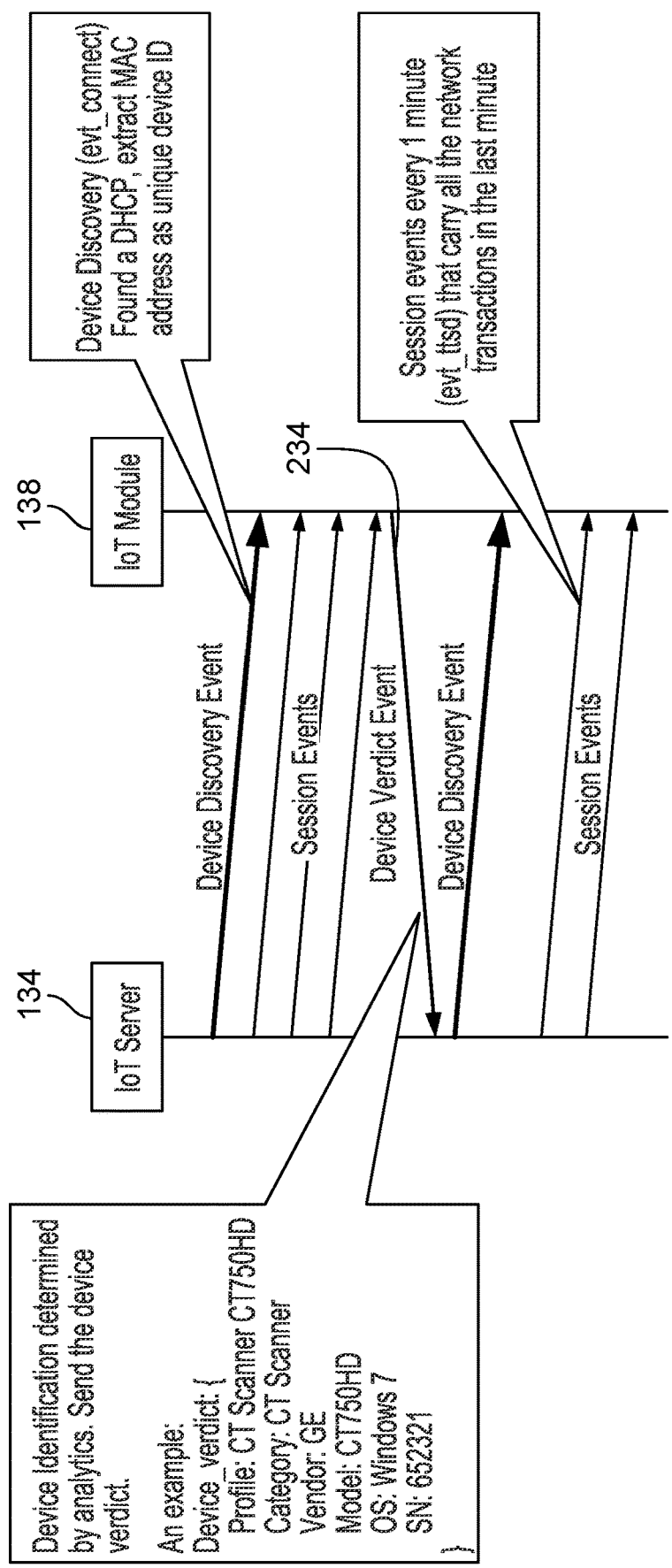
FIG. 2C illustrates an example event path between an IoT server and an IoT module.

In various embodiments, IoT server 134 is configured to provide log or other data (e.g., collected from passively monitoring network 110) to IoT module 138 (e.g., via frontend 142). FIG. 2C illustrates an example event path between an IoT server and an IoT module. IoT server 134 sends device discovery events and session events to IoT module 138. An example discovery event and a session event are illustrated in FIGS. 2D and 2E, respectively. In various embodiments, discovery events are sent by IoT server 134 whenever it observes a packet that can uniquely identify or confirm the identity of a device (e.g., whenever a DHCP, UPNP, or SMB packet is observed). Each session that a device has (with other nodes, whether inside or outside the device's network) is described within a session event that summarizes information about the session (e.g., source/destination information, number of packets received/sent, etc.). As applicable, multiple session events can be batched together by IoT server 134 prior to sending to IoT module 138. In the example shown in FIG. 2E, two sessions are included. IoT module 138 provides IoT server 134 with device classification information via device verdict events (234).

One example way of implementing IoT module 138 is using a microservices-based architecture. IoT module 138 can also be implemented using different programming languages, databases, hardware, and software environments, as applicable, and/or as services that are messaging enabled, bounded by contexts, autonomously developed, independently deployable, decentralized, and built and released with automated processes. One task performed by IoT module 138 is to identify IoT devices in the data provided by IoT server 134 (and provided by other embodiments of data appliances such as data appliances 136 and 148) and to provide additional contextual information about those devices (e.g., back to the respective data appliances).

Figure 2F:
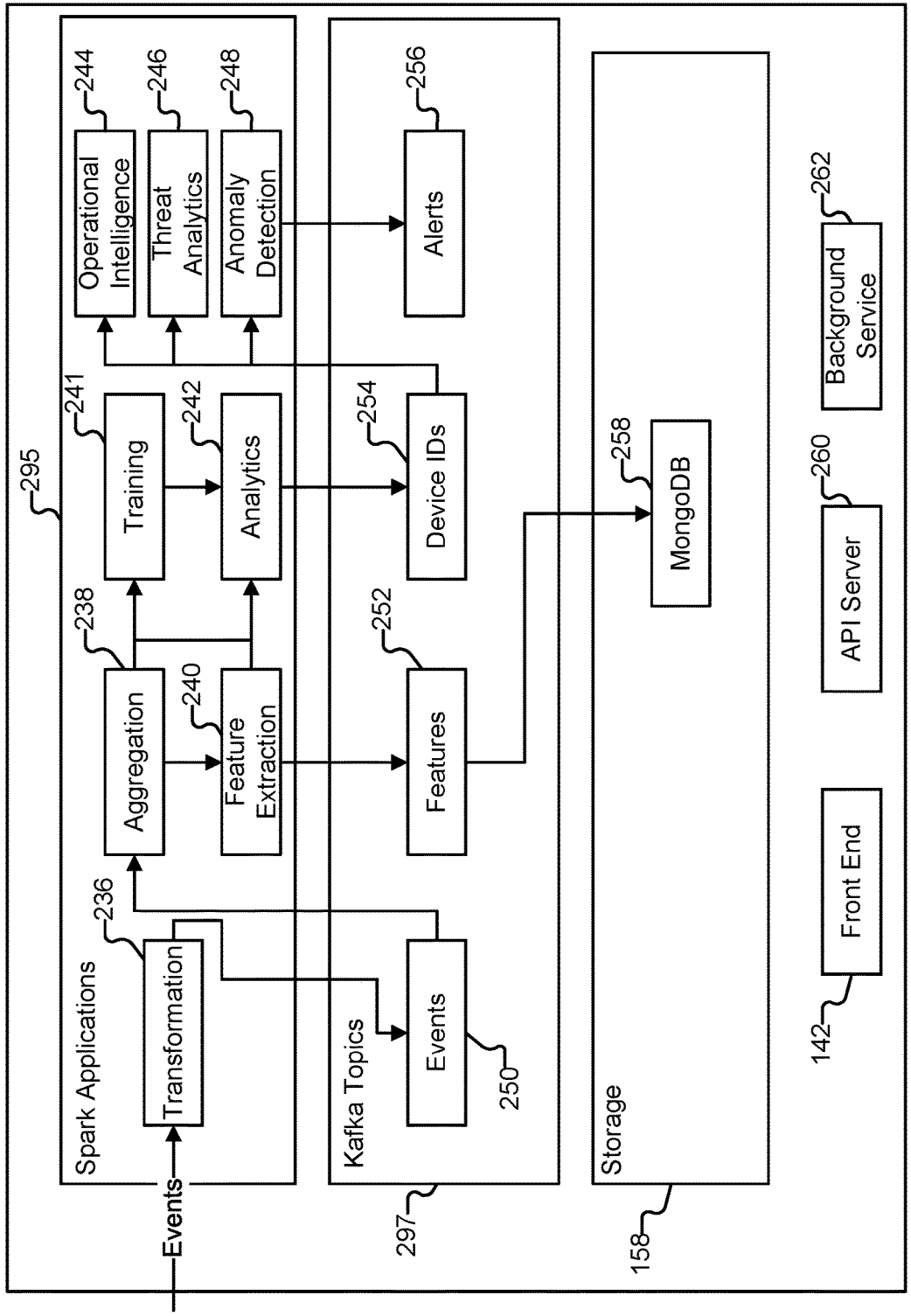
FIG. 2F illustrates an embodiment of an IoT module.

FIG. 2F illustrates an embodiment of an IoT module. Region 295 depicts a set of Spark Applications that run on intervals (e.g., every five minutes, every hour, and every day) across the data of all tenants. Region 297 depicts a Kafka message bus. Session event messages received by IoT module 138 (e.g., from IoT server 134) bundle together multiple events as observed at IoT server 134 (e.g., in order to conserve bandwidth). Transformation module 236 is configured to flatten the received session events into individual events and publish them at 250. The flattened events are aggregated by aggregation module 238 using a variety of different aggregation rules. An example rule is "for the time interval (e.g., 5 minutes), aggregate all event data for a specific device and each (APP-ID) application it used." Another example rule is "for the time interval (e.g., 1 hour), aggregate all event data for a particular device communicating with a particular destination IP address." For each rule, aggregation engine 238 tracks a list of attributes that need to be aggregated (e.g., a list of applications used by a device or a list of destination IP addresses). Feature extraction module 240 extracts features (252) from the attributes. Analytics module 242 uses the extracted features to perform device classification (e.g., using supervised and unsupervised learning), the results of which (254) are used to power other types of analytics (e.g., via operational intelligence module 244, threat analytics module 246, and anomaly detection module 248). Operational intelligence module 244 provides analytics related to the OT framework and operational or business intelligence (e.g., how a device is being used). Alerts (256) can be generated based on results of the analytics. In various embodiments, MongoDB 258 is used to store aggregated data and feature values. Background services 262 receive data aggregated by Spark applications and write data to MongoDB 258. API Server 260 pulls and merges data from MongoDB 258 to serve requests received from Front End 142.

Figure 2G:
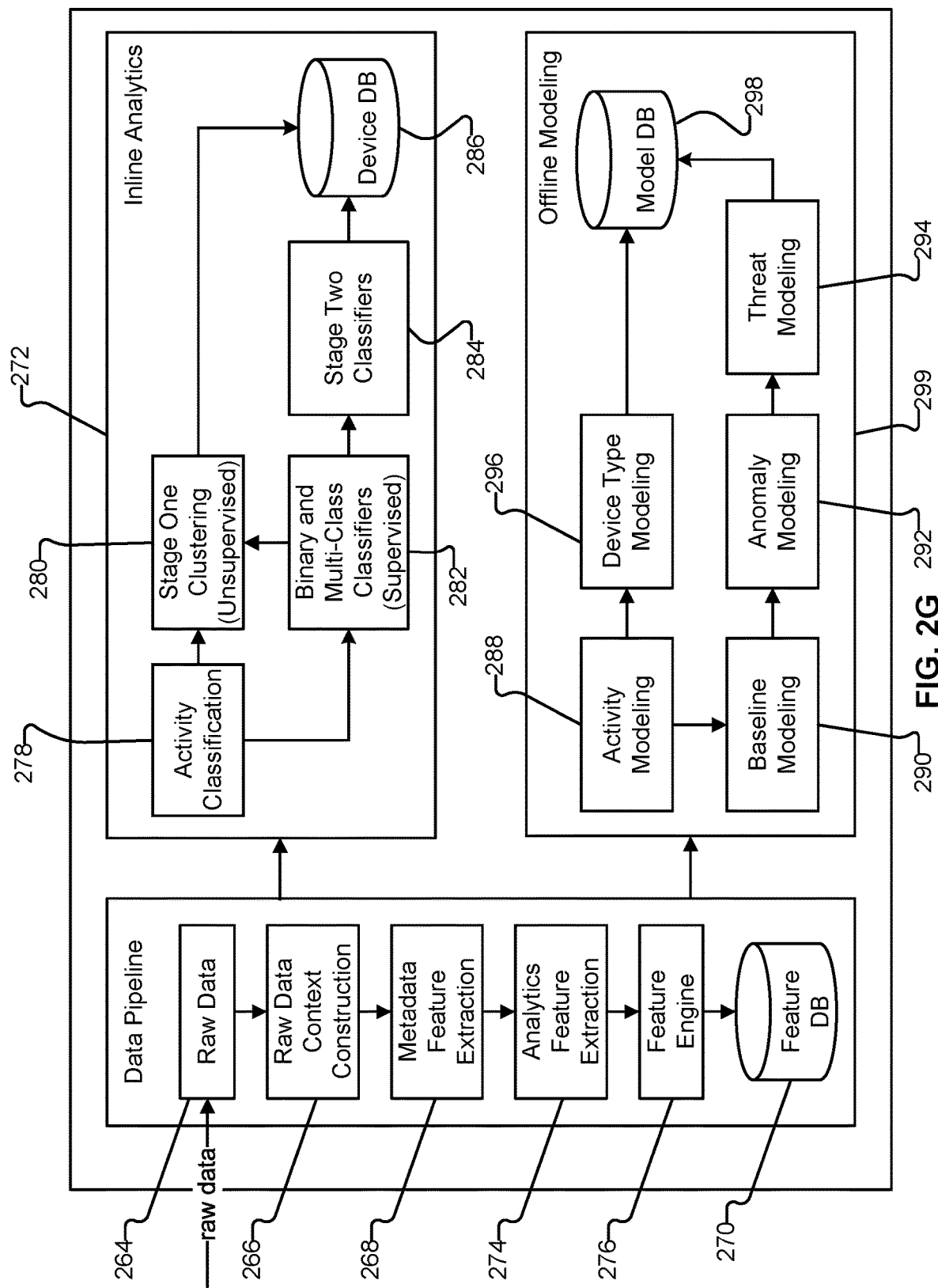
FIG. 2G illustrates an example way of implementing IoT device analytics.

FIG. 2G illustrates an example way of implementing IoT device identification analytics (e.g., within IoT module 138 as an embodiment of analytics module 242 and related elements). Discovery events and session events (e.g., as shown in FIGS. 2D and 2E, respectively) are received as raw data 264 on a message bus as a Kafka topic (and are also stored in storage 158). Features are extracted by feature engine 276 (which can, for example, be implemented using Spark/MapReducer). The raw data is enriched (266) with additional contextual information by security platform 140, such as geolocation information (e.g., of the source/destination addresses). During metadata feature extraction (268), features such as the number of packets sent within a time interval from an IP address, the number of applications used by a particular device during the time interval, and the number of IP addresses contacted by the device during the time interval are constructed. The features are both passed (e.g., on a message bus) in realtime to inline analytics engine 272 (e.g., in JSON format) and stored (e.g., in feature database 270 in an appropriate format such as Apache Parquet/DataFrame) for subsequent querying (e.g., during offline modeling 299).

In addition to features built from metadata, a second type of features can be built by IoT module 138 (274), referred to herein as analytics features. An example analytics feature is one built over time based on time-series data, using aggregate data. Analytics features are similarly passed in realtime to analytics engine 272 and stored in feature database 270.

Inline analytics engine 272 receives features on a message bus via a message handler. One task performed is activity classification (278), which attempts to identify activities (such as file download, login/authentication process, or disk backup activity) associated with the session based on the received feature values/session information and attaches any applicable tags. One way of implementing activity classification 278 is via a neural network-based multi-layer perceptron combined with a convolutional neural network.

Suppose, as a result of activity classification, it is determined that a particular device is engaging in printing activities (i.e., using printing protocols) and is also periodically contacting resources owned by HP (e.g., to check for updates by calling an HP URL and using it to report status information). In various embodiments, the classification information is passed to both a clustering process (unsupervised) and a prediction process (supervised). If either process results in a successful classification of the device, the classification is stored in device database 286.

A device can be clustered, by stage one clustering engine 280, into multiple clusters (e.g., acts like a printer, acts like an HP device, etc.) based on its attributes and other behavior patterns. One way of implementing clustering engine 280 is using an extreme gradient boosting framework (e.g., XGB). The stage one classifier can be useful for classifying devices that have not previously been seen but are similar to existing known devices (e.g., a new vendor of thermostats begins selling thermostat devices that behave similarly to known thermostats).

As shown in FIG. 2G, activity classification information is also provided to a set of classifiers 282 and a prediction is performed based on the provided features for the device. Two possibilities can occur. In a first scenario, it is determined that there is a high probability that the device matches a known device profile (i.e., a high confidence score). If so, information about the device is provided to a stage two classifier (284) that makes a final verdict for the device's identification (e.g., using the information it was provided and any additional applicable contextual information) and updates device database 286 accordingly. One way of implementing a stage two classifier is using a gradient boosting framework. In a second scenario, suppose the confidence score is low (e.g., the device matches both an HP printer and an HP laptop with 50% confidence). In this scenario, the information determined by classifiers 282 can be provided to clustering engine 280 as additional information usable in clustering.

Also shown in FIG. 2G is an offline modeling module 299. Offline modeling module 299 is contrasted with inline analytics engine 272 as it is not time constrained (whereas inline analytics engine 272 attempts to provide device classification information in realtime (e.g., as message 234)). Periodically (e.g., once per day or once per week), offline modeling module 299 (implemented, e.g., using Python) rebuilds models used by inline analytics module 272. Activity modeling engine 288 builds models for activity classifier 278, which are also used for device type models (296) which are used by classifiers for device identification during inline analytics. Baseline modeling engine 290 builds models of baseline behaviors of device models, which are also used when modeling specific types of device anomalies (292) and specific types of threats (294), such as a kill chain. The generated models are stored, in various embodiments, in model database 298.

IV. Network Entity Id AAA

Suppose, as was previously mentioned, Alice was issued a laptop 104 by ACME. Various components of network 110 will cooperate to authenticate Alice's laptop as she uses it to access various resources. As one example, when Alice connects laptop 104 to a wireless access point located within network 110 (not pictured), the wireless access point may communicate (whether directly or indirectly) with AAA server 156 while provisioning network access. As another example, when Alice uses laptop 104 to access her ACME email, laptop 104 may communicate (whether directly or indirectly) with directory service 154 while fetching her inbox, etc. As a commodity laptop running a commodity operating system, laptop 104 is able to generate appropriate AAA messages (e.g., RADIUS client messages) which will help laptop 104 gain access to the appropriate resources it needs.

As previously mentioned, one problem posed by IoT devices (e.g., device 146) in a network such as 110 is that such devices are often "unmanaged" (e.g., not configured, provisioned, managed by network administrators, etc.), do not support protocols such as RADIUS, and thus cannot be integrated with AAA services such as other devices such as laptop 104. A variety of approaches can be adopted to provide IoT devices with network access within network 110, each of which has drawbacks. One option is for ACME to limit IoT devices to use of a guest network (e.g., via a pre-shared key). Unfortunately, this can limit the utility of the IoT device if it is unable to communicate with other nodes within network 110 to which it should legitimately have access. Another option is to allow IoT devices unlimited access to network 110, mitigating the security benefits of having a segmented network. Yet another option is for ACME to manually specify rules that govern how a given IoT device should be able to access resources in network 110. This approach is generally untenable/unworkable for a variety of reasons. As one example, administrators may often not be involved in the deployment of IoT devices and thus will not know that policies for such devices should be included (e.g., in data appliance 102). Even where administrators might, e.g., manually configure policies for specific IoT devices in appliance 102 (e.g., for devices such as device 112), keeping such policies up to date is error prone and is generally untenable given the sheer number of IoT devices that might be present in network 110. Further, such policies will likely be simplistic (e.g., assigning CT scanner 112 by IP address and/or MAC address to a particular network) and not allow for finer grained control over connections/policies involving CT scanner 112 (e.g., dynamically including with policies applicable to surgical devices vs. point of sales terminals). Further, even where CT scanner 112 is manually included in data appliance 102, as previously mentioned, IoT devices will generally not support technologies such as RADIUS, and the benefits in having such AAA servers manage CT scanner 112's networking access will be limited as compared to other types of devices (e.g., laptop 104) which more fully support such technologies. As will be described in more detail below, in various embodiments, data appliance 102 (e.g., via IoT server 134) is configured to provide support for AAA functionality to IoT devices present in network 110 in a passive manner.

In the following discussion, suppose that Alice's department in ACME has recently purchased an interactive whiteboard 146 so that Alice can collaborate with other ACME employees as well as individuals outside of ACME (e.g., Bob, a researcher at Beta University having its own network 114, data appliance 136, and whiteboard 144). As part of the initial setup of whiteboard 146, Alice connects it to a power source and provides it with a wired connection (e.g., to an outlet in the conference room) or wireless credentials (e.g., the credentials for use by visitors of the conference room). When whiteboard 146 provisions a network connection, IoT server 134 (e.g., via a mechanism such as a network sensor as described above) will recognize whiteboard 146 as a new device within network 110. One action taken in response to this detection is to communicate with security platform 140 (e.g., creating a new record for whiteboard 146 in database 160 and retrieving any currently available contextual information associated with whiteboard 146 (e.g., obtaining the manufacturer of whiteboard 146, model of whiteboard 146, etc.)). Any contextual information provided by security platform 140 can be provided to (and stored at) data appliance 102 which can in turn provide it to directory service 154 and/or AAA server 156 as applicable. As applicable, IoT module 138 can provide updated contextual information about whiteboard 146 to data appliance 102 as it becomes available. And, data appliance 102 (e.g., via IoT server 134) can similarly provide security platform 140 with ongoing information about whiteboard 146. Examples of such information include observations about whiteboard 146's behaviors on network 110 (e.g., statistical information about the connections it makes) which can be used by security platform 140 to build behavioral profiles for devices such as whiteboard 146. Similar behavior profiles can be built by security platform 140 for other devices (e.g., whiteboard 144). Such profiles can be used for a variety of purposes, including detecting anomalous behaviors. As one example, data appliance 148 can use information provided by security platform 140 to detect whether thermometer 152 is operating anomalously as compared to historic observations of thermometer 152, and/or as compared to other thermometers (not pictured) of similar model, manufacturer, or more generally, including thermometers present in other networks. If anomalous behavior is detected (e.g., by data appliance 148), appropriate remedial action can be automatically taken, such as restricting thermometer 152's access to other nodes on network 116, generating an alert, etc.

Figure 3:
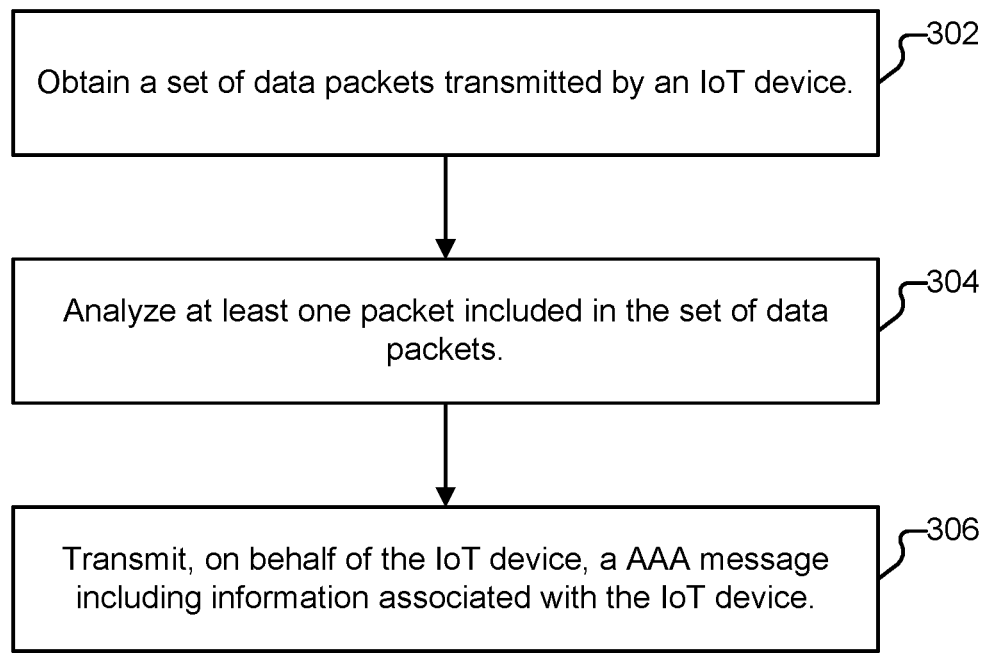
FIG. 3 illustrates an embodiment of a process for passively providing AAA support for an IoT device in a network.

FIG. 3 illustrates an embodiment of a process for passively providing AAA support for an IoT device in a network. In various embodiments, process 300 is performed by IoT server 134. The process begins at 302 when a set of packets transmitted by an IoT device is obtained. As one example, when whiteboard 146 is first provisioned on network 110, such packets can be passively received by IoT server 134 at 302. Packets can also be received at 302 during subsequent use of whiteboard 146 (e.g., as Alice has whiteboarding sessions with Bob via whiteboard 144). At 304, at least one packet included in the set of data packets is analyzed. As one example of the processing performed at 304, IoT server 134 determines that the packets received at 302 are being transmitted by whiteboard 146. One action that IoT server 134 can take is to identify whiteboard 146 as a new IoT device on network 110 and obtain contextual information from IoT module 138 if available. At 306, IoT server 134 transmits, on behalf of the IoT device, a AAA message that includes information associated with the IoT device. An example of such a message is shown in FIG. 4A. As previously mentioned, whiteboard 146 does not support the RADIUS protocol. However, IoT server 134 can generate a message such as is depicted in FIG. 4A (e.g., using information received at 302 and also from security platform 140 as applicable) on behalf of whiteboard 146. As previously mentioned, when IoT server 134 provides information about whiteboard 146 to IoT module 138, IoT module 138 can take a variety of actions such as creating a record for whiteboard 146 in database 160 and populating that record with contextual information about whiteboard 146 (e.g., determining its manufacturer, model number, etc.). As additional contextual information about whiteboard 146 is gathered by security platform 140, its profile can be updated and propagated to data appliance 102. When whiteboard 146 is initially provisioned within network 110, no additional contextual information may be available (e.g., security platform 140 may not have such additional information or providing such information by security platform 140 to IoT server 134 may not be instant). Accordingly, and as is depicted in FIG. 4A, the RADIUS message generated by IoT server 134 on behalf of whiteboard 146 may include limited information. As additional contextual information is received (e.g., by IoT server 134 from IoT module 138), subsequent RADIUS messages sent by IoT server 134 on behalf of whiteboard 146 can be enriched with such additional information. Examples of such subsequent messages are illustrated in FIGS. 4B and 4C. FIG. 4B illustrates an example of a RADIUS message that IoT server 134 can send on behalf of whiteboard 146 once contextual information about whiteboard 146 has been provided by IoT module 138 (e.g., which contains a database of contextual information about a wide variety of IoT devices). In the example shown in FIG. 4B, contextual information such as the manufacturer of the whiteboard (Panasonic) and the nature of the device (e.g., it is an interactive whiteboard) is included. Such contextual information can be used by AAA servers such as AAA server 156 to provide AAA services to whiteboard 146 (without having to modify whiteboard 146), such as by automatically provisioning it on a subnetwork dedicated to teleconferencing equipment. Other types of IoT devices can also be automatically grouped based on attributes such as device type, purpose, etc. (e.g., with critical surgical equipment automatically provisioned on a subnetwork dedicated to such equipment and thus isolated from other devices on the network). Such contextual information can be used to enforce policies such as traffic shaping policies, such as a policy giving preferential treatment to whiteboard 146 packets over social networking packets (e.g., as determined using APP-ID). Fine-grained policies could similarly be applied to communications with critical surgical equipment (e.g., preventing any device in communication with such equipment from having an out of date operating system, etc.). In the example shown in FIG. 4C, yet more additional contextual information is included by IoT server 134 in RADIUS messages on behalf of whiteboard 146. Such additional contextual information includes additional attribute information such as the device model, operating system, and operating version. When whiteboard 146 is initially provisioned in network 110, all of the contextual information depicted in FIG. 4C will likely not be available. As whiteboard 146 is used within network 110 over time, additional contextual information can be collected (e.g., as IoT server 134 continues to passively observe packets from whiteboard 146 and provide information to security platform 140). This additional information can be leveraged (e.g., by data appliance 102) to enforce fine-grained policies. As one example, as shown in FIG. 4C, whiteboard 146 runs a particular operating system that is Linux-based and has a version of 3.16. Frequently, IoT devices will run versions of operating systems that are not upgradable/not patchable. Such devices can pose security risks as exploits are developed for those operating systems. Data appliance 102 can implement security policies based on contextual information such as by isolating IoT devices having out of date operating systems from other nodes in network 110 (or otherwise limiting their access) while permitting less restrictive network access to those with current operating systems, etc.

FIGS. 4A-4C depict examples of RADIUS access request messages. As applicable, IoT server 134 can generate a variety of types of RADIUS messages on behalf of whiteboard 146. As one example, RADIUS accounting start messages can be triggered when traffic from whiteboard 146 is first observed. Periodic RADIUS accounting interim update messages can be sent while the whiteboard is in use, and RADIUS accounting stop messages can be sent when whiteboard 146 goes offline.

V. IOT Device Discovery and Identification

As discussed above, one task performed by security platform 140 (e.g., via IoT module 138) is IoT device classification. As an example, when IoT server 134 transmits a device discovery message to IoT module 138, IoT module 138 attempts to determine a classification for the device and respond (e.g., with verdict 234 shown in FIG. 2C). The device is associated by IoT module 138 with a unique identifier so that, as applicable, subsequent classification of the device need not be performed (or, as applicable, performed less frequently than would otherwise be performed). Also as discussed above, the determined classification can be used (e.g., by data appliance 102) to enforce policies against traffic to/from the device.

A variety of approaches can be used to classify a device. A first approach is to perform classification based on a set of rules/heuristics that leverage the device's static attributes, such as an organizationally unique identifier (OUI) appearing in the first three bytes of a Media Access Control (MAC) address, the types of applications it executes, etc. A second approach is to perform classification using machine learning techniques that leverage the device's dynamic, but predefined attributes extracted from its network traffic (e.g., number of packets sent per day). Unfortunately, both of these approaches have weaknesses.

A rule-based approach generally requires that a separate rule be manually created for each type of IoT device (describing which attributes/values should be used as a signature for a type of device's signature). One challenge presented by this approach is in determining which signatures are both relevant to identifying a device and unique among other device signatures. Further, with a rule-based approach, a limited number of static attributes that can easily be acquired from traffic are available (e.g., user agent, OUI, URL destination, etc.). The attributes generally need to be simple enough that they show up in a pattern that a regular expression can match on. Another challenge is in identifying new static attributes that may be present/identifiable as new devices enter a market (e.g., a new brand or model of CT scanner is offered). Another challenge is that all matching attributes in the network traffic need to be collected in order for a rule to be triggered. A verdict cannot be reached with fewer attributes. As an example, a signature may require a particular device with a particular OUI to connect to a particular URL. Having the OUI itself may already be a sufficient indicator of a device's identity, but the signature will not trigger until the URL is also observed. This would cause further delay in determining the device's identity. Another challenge is maintaining and updating signatures as static attributes for a device change over time (e.g., because of updates made to the device or services used by the device). As an example, a particular device may have initially been manufactured using a first type of network card, but over time the manufacturer may have switched to a different network card (which will exhibit a different OUI). If a rule-based system is unaware of the change, false positives may result. Yet another challenge is in scaling signature generation/verification when the number of new IoT devices brought online each day approaches millions of new device instances. As a result, newly created rules may conflict with existing rules and causing false positives in classification.

A machine learning-based approach generally involves creating training models based on static and/or dynamic features extracted from network traffic. The result of prediction on network data from a new IoT device is based on pre-trained models that provide an identity of a device with an associated accuracy. Examples of problems with a machine learning approach are as follows. The computation time required to reach a desired accuracy may be unacceptable, where prediction is done on every new device, or a device without a constant/unique ID (e.g., a MAC address). There may be thousands or tens of thousands of features that need to be generated, and those features may transform over a predefined time window, taking significant time (which may defeat the purpose of policy enforcement) before a sufficient number of features are available to make an effective prediction. Further, the cost could be high to build and maintain a large data pipeline for streaming network data if a goal is to minimize a delay in prediction. Yet another problem is that noise brought in by irrelevant features specific to a given deployment environment could decrease the accuracy of a prediction. And, there is a challenge in maintaining and updating models when the number of device types reaches the tens of thousands or higher.

In various embodiments, security platform 140 addresses the problems of each of the two aforementioned approaches by using a hybrid approach to classification. In an example hybrid approach, a network behavior pattern identifier (also referred to herein as a pattern ID) is generated for each type of device. In various embodiments, a pattern ID is a list of attributes or sequence features combined, with their respective probabilities (as importance scores for a feature or behavior category), that forms a distinct network behavior description and can be used to identify the type of an IoT device. The pattern IDs can be stored (e.g., in a database) and used to identify/verify the identity of devices.

When training on a set of attributes, certain approaches, such as an extreme gradient boosting framework (e.g., XGB), can provide a top list of important features (whether static attributes, dynamic attributes, and/or aggregated/transformed values). The pattern ID can be used to uniquely identify a device type once established. If particular features are dominant for a device (e.g., a particular static feature (such as contacting a highly-specific URL at boot time) identifies a device with 98% confidence), they can be used to automatically generate a rule. Even where no dominant features are present, a representation of the top features can nonetheless be used as the pattern ID (e.g., where a set of multiple features are concatenated into a pattern). By training on a data set that includes all known models (and all known IoT devices), potential conflict between models/uniquely identifying features can be avoided. Further, the pattern ID need not be human-readable (but can be stored, shared, and/or reused for identification purposes). Significant time savings can also be realized by this approach, such that it can be used in near-realtime classification. As soon as a dominant feature is observed, classification of a particular device can occur (instead of having to wait until a large number of features occur).

An example of data that could be used to create a pattern ID for a "Teem Room Display iPad" device could include the following (with a full list automatically generated through training of a multivariate model or training multiple binary models):

Apple device (100%)
Special iPad (>98.5%)
Teem Room App (>95%)
Meeting volume pattern VPM-17 (>95%)
Server-in-the-cloud (>80%)

An example way of implementing a hybrid approach is as follows. A neural network-based machine learning system can be used for automated pattern ID training and generation. Examples of features that can be used to train the neural network model include both static features extracted from network traffic (e.g., OUI, hostname, TLS fingerprint, matched L7 payload signatures, etc.) and sequence features extracted from network traffic but not specific to the environment (e.g., applications, L7 attributes of an application, volume range converted to categorical features, etc.). A lightweight data pipeline can be used to stream selected network data for feature generation in realtime. A prediction engine can be used that imports models and provides caching to minimize delays in prediction. In prediction, a short (e.g., minute-based) aggregation can be used to stabilize the selected sequence features. Customized data normalization, enrichment, aggregation, and transformation techniques can be used to engineer the sequence features. A longer aggregation window can be used in training for better accuracy. Accuracy can be improved for prediction with features being merged and aggregated over time. A backend feedback engine can be used to route the results of a "slow path" prediction system (e.g., a machine learning-based approach that includes a device type modeling subsystem and a device group modeling subsystem) that helps expand attributes used for pattern ID prediction. A device group model can be trained to compensate for issues with a device type model when not enough samples or features are available, to improve the accuracy over an acceptable threshold (e.g., assigning prediction results based on a set of predefined types, some of which come with another subsystem to cluster similar types of devices that are unlabeled). Finally, a verdict module can be used to publish results from the realtime prediction engine.

Example advantages of a hybrid approach to classification such as is described herein are as follows. First, fast convergence can occur, allowing for a given device to be potentially identified within minutes or seconds. Second, it addresses individual problems of rule-based and machine learning-based systems. Third, it provides stability and consistency in prediction results. Fourth, it has scalability to support tens of thousands (or more) different types of IoT devices. Prediction is generally only required on new devices (even if a given device lacks a unique ID assignment, such as an L3 network traffic-based identification).

Figure 5:
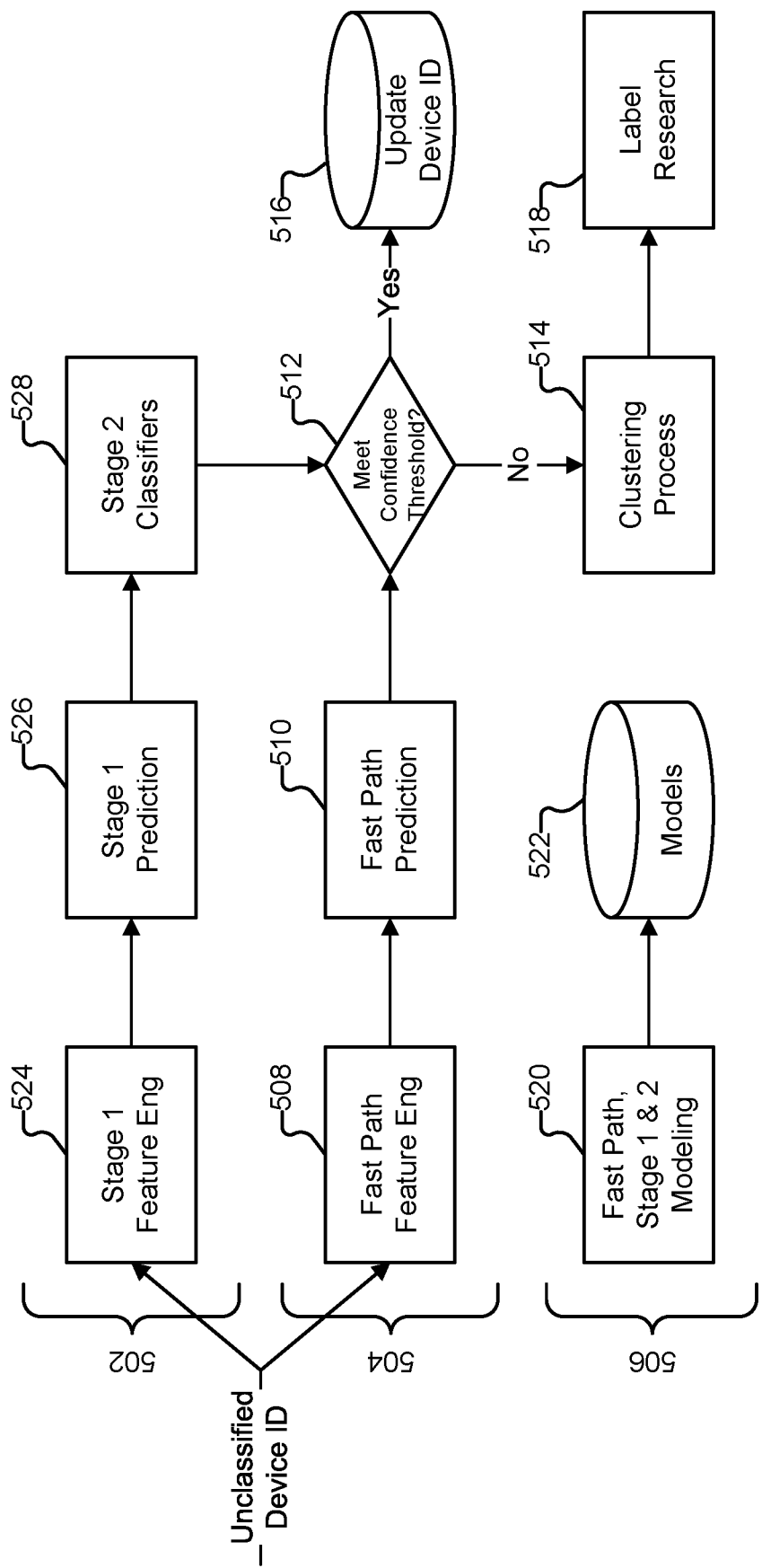
FIG. 5 illustrates an embodiment of an IoT module.

An embodiment of module 138 is shown in FIG. 5. One example way of implementing IoT module 138 is using a microservices-based architecture in which services are fine-grained and protocols are lightweight. Services can also be implemented using different programming languages, databases, hardware, and software environments, as applicable, and/or relatively small services that are messaging enabled, bounded by contexts, autonomously developed, independently deployable, decentralized, and built and released with automated processes.

As previously mentioned, in various embodiments, security platform 140 periodically receives information (e.g., from data appliance 102) about IoT devices on a network (e.g., network 110). In some cases, the IoT devices will have previously been classified by security platform 140 (e.g., a CT scanner that was installed on network 110 last year). In other cases, the IoT devices will be newly seen by security platform 140 (e.g., the first time whiteboard 146 is installed). Suppose a given device has not previously been classified by security platform 140 (e.g., no entry for the device is present in database 286 which stores a set of unique device identifiers and associated device information). As illustrated in FIG. 5, information about the new device can be provided to two different processing pipelines for classification. Pipeline 504 represents a "fast path" classification pipeline (corresponding to a pattern ID-based scheme) and pipeline 502 represents a "slow path" classification pipeline (corresponding to a machine learning-based scheme).

In pipeline 504, a fast path feature engineering is performed (508) to identify applicable static and sequence features of the device. A fast path prediction is performed (510) using pattern IDs or previously built models (e.g., models based on top important features and built using offline processing pipeline 506). A confidence score for the device matching a particular pattern is determined (512). If the confidence score for a device meets a pre-trained threshold (e.g., based on the overall prediction accuracy of module 138 or components thereof, such as 0.9), a classification can be assigned to the device (in device database 516) or updated as applicable. Initially, the confidence score will be based on the near-realtime fast path processing. An advantage of this approach is that data appliance 102 can begin applying policies to the device's traffic very quickly (e.g., within a few minutes of module 138 identifying the device as new/unclassified). Appliance 102 can be configured to fail-safe (e.g., reduce/restrict the device's ability to access various network resources) or fail-danger (e.g., allow the device broad access) pending a classification verdict from system 140. As additional information becomes available (e.g., via the slow path processing), the confidence score can be based on that additional information, as applicable (e.g., increasing the confidence score or revising/correcting mistakes made during fast path classification).

Examples of features (e.g., static attributes and sequence features) that can be used include the following. Pattern IDs can be any combination of these attributes with logical conditions included:

OUI in mac address
Hostname string from decoded protocols
User agent string from HTTP, and other clear text protocols
System name string from decoded SNMP responses
OS, hostname, domain, and username from decoded LDAP protocols
URLs from decoded DNS protocols
SMB versions, commands, errors from decoded SMB protocols
TCP flags
Option strings from decoded DHCP protocols Strings from decoded IoT protocols such as Digital Imaging and Communications in Medicine (DICOM)
List of inbound applications from local network
List of inbound applications from Internet
List of outbound applications to local network
List of outbound applications to Internet
List of inbound server ports from local network
List of inbound server ports from Internet
List of outbound server ports to local network
List of outbound server ports to Internet
List of inbound IPs from local network
List of inbound URLs from Internet
List of outbound IPs to local network
List of outbound URLs to Internet In some cases, the confidence score determined at 512 may be very low. One reason this can occur is because the device is a new type (e.g., a new type of IoT toy or other type of product not previously analyzed by security platform 140) and there is no corresponding pattern ID available for the device on security platform 140. In such a scenario, information about the device and classification results can be provided to offline processing pipeline 506 which, e.g., can perform clustering (514) on the behaviors exhibited by the device and other applicable information (e.g., to determine that the device is a wireless device, acts like a printer, uses DICOM protocol, etc.). Clustering information can be applied as labels and flagged for additional research 518 as applicable, with any subsequently seen similar devices automatically grouped together. If, as a result of research, additional information about a given device is determined (e.g., it is identified as corresponding to a new type of consumer-oriented IoT meat thermometer), the device (and all other devices having similar properties) can be relabeled accordingly (e.g., as a brand XYZ meat thermometer) and an associated pattern ID generated and be made usable by pipelines 502/504 as applicable (e.g., after models are rebuilt). In various embodiments, offline modeling 520 is a process that runs daily to train and update various models 522 used for IoT device identification. In various embodiments, models are refreshed daily to cover new labeled devices, and are rebuilt weekly to reflect behavior changes (for slow path pipeline 502) and accommodate new features and data insights added during the week. Note that when adding new types of devices to security platform 140 (i.e., creating new device patterns), it is possible that multiple existing device patterns will be impacted, requiring that either the list of features or their importance scores be updated. The process can be performed automatically (and is a major advantage compared to a rule-based solution).

For fast path modeling, neural network-based models (e.g., FNN) and general machine learning models (e.g., XGB) are used extensively for multivariate classification models. Binary models are also built for selected profiles to help improve results and provide input to clustering. A binary model gives yes/no answers to an identity of a device, or certain behaviors of a device. For example, a binary model can be used to determine whether a device is a type of IP phone or unlikely to be an IP phone. A multivariate model will have many outputs normalized to a probability of 1. Each output corresponds to a type of device. Even though binary models are generally faster, it would require that a device goes through many of them in prediction to be able to find the right "yes" answer. A multivariate model can achieve that in one step.

Slow path pipeline 502 is similar to pipeline 504 in that features are extracted (524). However, the features used by pipeline 502 will typically take a period of time to build. As one example, a feature of "number of bytes sent per day" will require a day to collect. As another example, certain usage patterns may take a period of time to occur/be observed (e.g., where a CT scanner is used hourly to perform scans (a first behavior), backs up data daily (a second behavior), and checks a manufacturer's website for updates weekly (a third behavior). Slow path pipeline 502 invokes a multivariate classifier (526) in an attempt to classify a new device instance on a full set of features. The features used are not limited to static or sequence features, but include volume and time series based features as well. This is generally referred as a stage one prediction. For certain profiles when the stage one prediction result is not optimal (with a lower confidence), a stage two prediction is used in an attempt to improve the result. Slow path pipeline 502 invokes a set of decision tree classifiers (528) supported by additional imported device context to classify a new device instance. The additional device context is imported from external source. As an example, a URL the device has connected to may have been given a category and a risk-based reputation which can be included as a feature. As another example, an application used by the device may have been given a category and a risk based score which can be included as a feature. By combining result from stage one prediction 526 and stage two prediction 528, a final verdict of the slow path classification can be reached with a derived confidence score.

There are generally two stages included in slow path pipeline 502. In the slow path pipeline, in some embodiments, stage one models are built with multivariate classifiers, based on neural network techniques. Stage two of the slow path pipeline is generally a set of decision-based models with additional logic to handle probability-related exceptions of stage one. In prediction, the stage two will consolidate input from stage one, applying rules and context to verify stage one output and generate a final output of the slow path. The final output will include an identity of the device, an overall confidence score, the pattern ID that can be used for future fast path pipeline 504, and an explanation list. The confidence score is based on the reliability and accuracy of the model (models also have confidence scores), and the probability as part of the classification. The explanation list will include a list of features that contribute to the result. As mentioned above, investigation can be triggered if the result deviates from known pattern IDs.

In some embodiments, for slow path modeling, two types of models are built, one for individual identity, and one for a group identity. It is often harder to tell the difference between, for example, two printers from different vendors or with different models than it is to differentiate a printer from a thermometer (e.g., because printers tend to exhibit network behavior, speak similar protocols, etc.). In various embodiments, various printers from various vendors are included into a group, and a "printer" model is trained for group classification. This group classification result may provide a better accuracy than a specific model for a specific printer and can be used to update the confidence score of a device, or provide reference and verification to the individual profile identity-based classification, as applicable.

Figure 6:
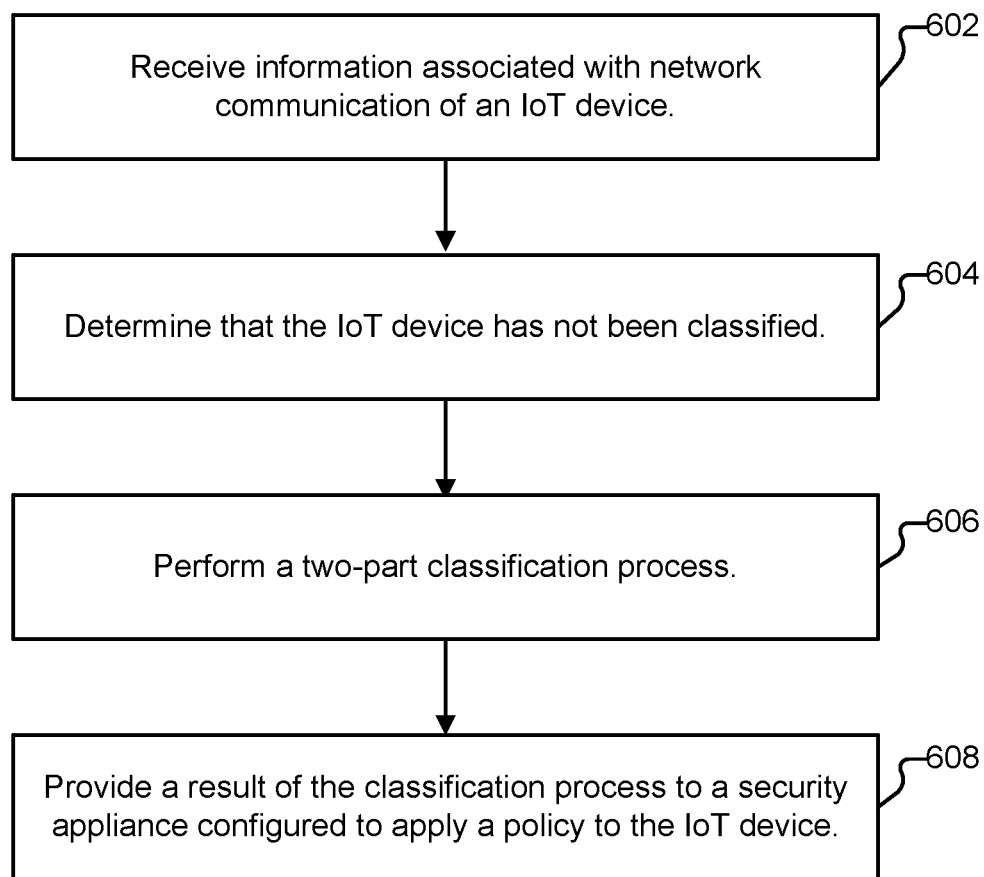
FIG. 6 illustrates an example of a process for classifying an IoT device.

FIG. 6 illustrates an example of a process for classifying an IoT device. In various embodiments, process 600 is performed by security platform 140. Process 600 can also be performed by other systems as applicable (e.g., a system collocated on-premise with IoT devices). Process 600 begins at 602 when information associated with a network communication of an IoT device is received. As one example, such information is received by security platform 140 when data appliance 102 transmits to it a device discovery event for a given IoT device. At 604, a determination is made that the device has not been classified (or, as applicable, that a re-classification should be performed). As one example, platform 140 can query database 286 to determine whether or not the device has been classified. At 606, a two-part classification is performed. As an example, a two-part classification is performed at 606 by platform 140 providing information about the device to both fast path classification pipeline 504 and slow path classification pipeline 502. Finally, at 608, a result of the classification process performed at 606, along with the summarized network behavior from baseline modeling (290) is provided to a security appliance configured to apply a policy to the IoT device. Examples of such summarized network behavior include the most used applications, URLs, and other attributes that can help form a security appliance policy that can be "extracted" from machine-learning trained baseline models for IoT device profiles. As mentioned above, this allows for highly fine-grained security policies to be implemented in potentially mission critical environments with minimal administrative effort.

In a first example of performing process 600, suppose that an Xbox One game console has been connected to network 110. During classification, a determination can be made that the device has the following dominant features: a "vendor=Microsoft" feature with 100% confidence, a "communicates with Microsoft cloud server" feature with 89.7% confidence, and matches a "game console" feature with 78.5% confidence. These three features/confidence scores can collectively be matched against a set of profile IDs (a process done by a neural network-based prediction) to identify the device as being an Xbox One game console (i.e., a profile ID match is found that meets a threshold at 512). In a second example, suppose that an AudioCodes IP phone has been connected to network 110. During classification, a determination can be made that the device matches a "vendor=AudioCodes" feature with 100% confidence, an "is an IP audio device" feature with 98.5% confidence, and "acts like a local server" feature with 66.5%. These three features/confidence scores are also matched against the set of profile IDs, but in this scenario suppose that no existing profile ID is matched with sufficient confidence. Information about the device can then be provided to clustering process 514 and, as applicable, a new profile ID can ultimately be generated and associated with the device (and used to classify future devices).

As applicable, security platform 140 can recommend particular policies based on the determined classification information, described in more detail below. The following are examples of policies that can be enforced:
  deny Internet traffic for all Infusion Pumps (irrespective of vendor)
  deny Internet traffic for all GE ECG Machines except from/to certain GE hosts
  only allow internal traffic to Picture Archiving and Communication System (PACS) servers for all CT Scanners (irrespective of vendor)

VI. IOT Security Policy on a Firewall

As mentioned above, IoT devices are often special purpose devices (as contrasted with general computing devices such as laptops) that have predefined behaviors that can be observed on a network. As one example, irrespective of manufacturer (e.g., GE or Fujitsu), a CT scanner will have similar functionality/exhibit similar behaviors on a network as with other CT scanners, such as transmitting captured patient images using one or more specific protocols, to a networked image server for medical staff to examine (e.g., via an interface to the server). Other types of systems (e.g., Heating, Ventilation, and Air Conditioning (HVAC) systems) will exhibit their own set of similar typically predefined behaviors (e.g., reporting a temperature value to a server once a minute via a particular protocol).

As mentioned above, analysis of these behaviors (e.g., by security platform 140) from traffic observed (e.g., by data appliance 102) allows particular IoT devices to be identified (including by identifying particular instances of a device, model of device, manufacturer of device, type of device, etc). Further, the bi-product of the device identification will have a device baseline model trained (e.g., by baseline modeling engine 290) for the purpose of the classification. As applicable, anomaly detection module 248 can be used to filter out known anomalous behaviors when creating a baseline for a device (or group of devices). This deep machine learning model captures the network behavior described above. This baseline model can not only used in device identity prediction, but can also be used to generate a common list of behavior summaries ranked by how popular a network behavior is seen on a device profile. One approach to behavior summarization is to extract and rank the top contributing features (used in device identification) from the baseline model during the training process, using ML algorithms such as XGB. Other approaches can also be used or combined (e.g., heuristic approaches). Top contributing features (subject to a reliability/confidence threshold) essentially highlight what are the most common network behaviors a type of device will exhibit, from the thousands of attributes or features used in the training and can be used in recommendations (e.g., whitelisting/blacklisting particular URLs, protocols, etc.). The behavior summaries can include what applications are used, what connections are made to certain network domains, what payload is carried in the application, the volume, the time and frequency of the communication, etc. Each attribute is assigned a frequency category such as "rare," "often," or "regular." Each attribute can also be assigned a range category such as "less than 1 MB per hour." Anomalies (e.g., compromised or malfunctioning/misconfigured IoT devices) can be detected (e.g., by data appliance 102 working in conjunction with anomaly detection module 248) as deviations from baselines. These attributes (and known vulnerabilities to particular attacks) can be used as a blueprint to automatically create a recommended firewall policy for constraining network activity associated with a particular IoT device, type of device, etc. For example, a regularly used application and URL can be used to build an "allow" firewall policy. In another example, an application not part of the baseline behavior could be used to build a "deny" firewall policy. Users will be able to adjust the policy based on the frequency of a network behavior summarized from hundreds of thousands of similar devices. And, any known vulnerabilities (e.g., susceptibility of a particular device to a particular attack) can be separately modeled and incorporated into recommended policies, as applicable. An example of a top feature for a given device type is that the device checks for an update approximately once per day at a particular URL (e.g., www.siemens.com/updates). If a threshold number of devices sharing the device type exhibit similar baseline behavior, the feature can be selected as a recommended whitelist item for device profiles associated with that device type.

FIG. 7A illustrates a first approach to implementing a set of policies pertaining to CT scanner/image servers that Acme could deploy within network 110. In particular, suppose Acme has deployed two types of CT scanners (made by GE and Fujitsu). An administrator of network 110 (hereinafter referred to as Charlie) can interact with an interface (e.g., provided by data appliance 102 and/or security platform 140 as applicable) and manually specify, for each CT scanner and image server within network 110, the protocols, ports, and IP addresses with which they are allowed to communicate. Unfortunately, this approach can be time consuming and error prone. As one example, when a new CT scanner is added to the environment, Charlie will need to manually add to the rules shown in FIG. 7A, and also potentially change/remove some of the rules (e.g., if the new CT scanner replaces an existing one and/or network information changes). If the total number of IoT devices in an environment is low and the IoT devices are assigned static IP addresses, manual maintenance of rules such as are shown in FIG. 7A may be feasible. In practice, however, a given environment may have hundreds or thousands of IoT devices (or more), and/or may use DHCP, and manual maintenance of rules is infeasible.

An alternate approach is to abstract applications (e.g., "DICOM-App," indicating particular protocols/ports/etc. corresponding to network traffic used to communicate medical imaging information) and device types (e.g., GE-Xray-Device), in accordance with techniques described herein. An abstraction of the rules shown in FIG. 7A is depicted in FIG. 7B. Of note, Charlie does not need to provide the IP addresses, ports, or protocols of relevance to the IoT policies, but rather can use the abstracted application types and device types. Policies such as are shown in FIG. 7B can be compiled and used at runtime by data appliance 102. During compilation, the abstracted elements (e.g., GE-Xray-Device) will be replaced (e.g., with the IP address of each IoT device matching that device identification), based on information stored on data appliance 102 (such as APP-ID information, IP information, and/or a dictionary of device types).

Charlie can elect to manually write IoT device rules (e.g., using the aforementioned abstractions if desired), but can also be provided with policy recommendations by security platform 140. The recommendations are based, in various embodiments, on device profiles (which include device type or other information) and baseline/typical behavior (across many different customer environments/deployments) of a set of devices sharing various characteristics. If Charlie accepts the recommended policies, appropriate rules (e.g., rules such as are shown in FIG. 7B) can be automatically created (e.g., by security platform 140) and imported into security appliance 102 for enforcement. Security appliance 102 will learn device profiles of IoT devices on its network and match applicable policies to devices as sources or destinations. As applicable, the policies can be translated (e.g., by security platform 140) into formats usable by types of infrastructure other than security appliance 102, such as network access controllers.

Figure 8:
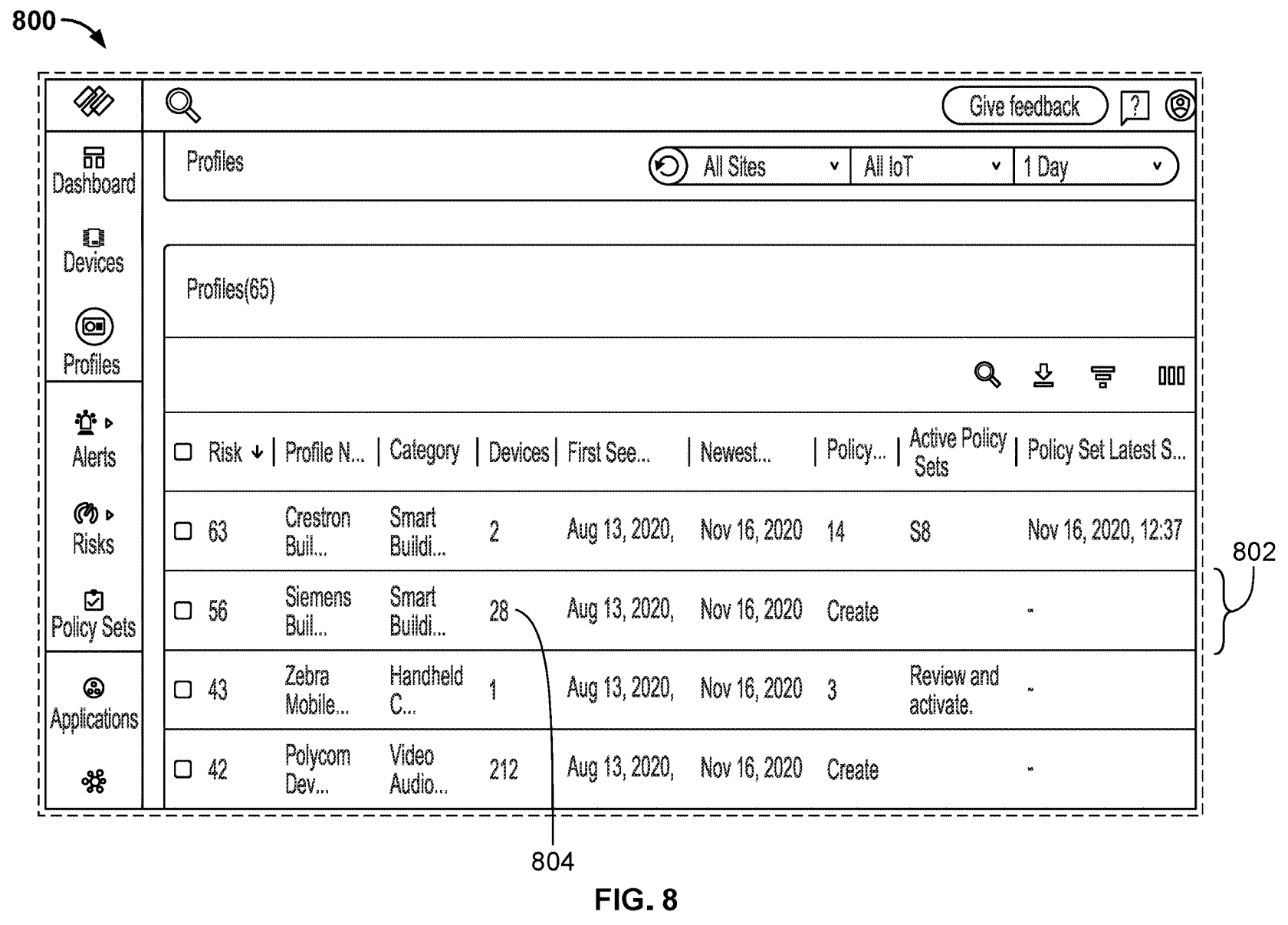

In the following discussion, suppose Acme has recently purchased a set of building automation devices (e.g., a set of badge readers), installed them inside various Acme facilities, and brought the devices online onto a portion of network 110. Using device identification/classification techniques described above, security platform 140 (working with data appliance 102) will identify that Acme has added the 28 new badge reader devices to its network and learn various behaviors taken by those specific badge reader devices within Acme's network environment as they operate (e.g., during an initial observation period of a week or month). A portion of an administrative interface provided by security platform 140 is shown in FIG. 8. Interface 800 indicates that Acme currently has 65 total kinds of IoT devices (having corresponding profiles) operating in its environment. The newly added badge readers are depicted in row 802.

Figure 9:
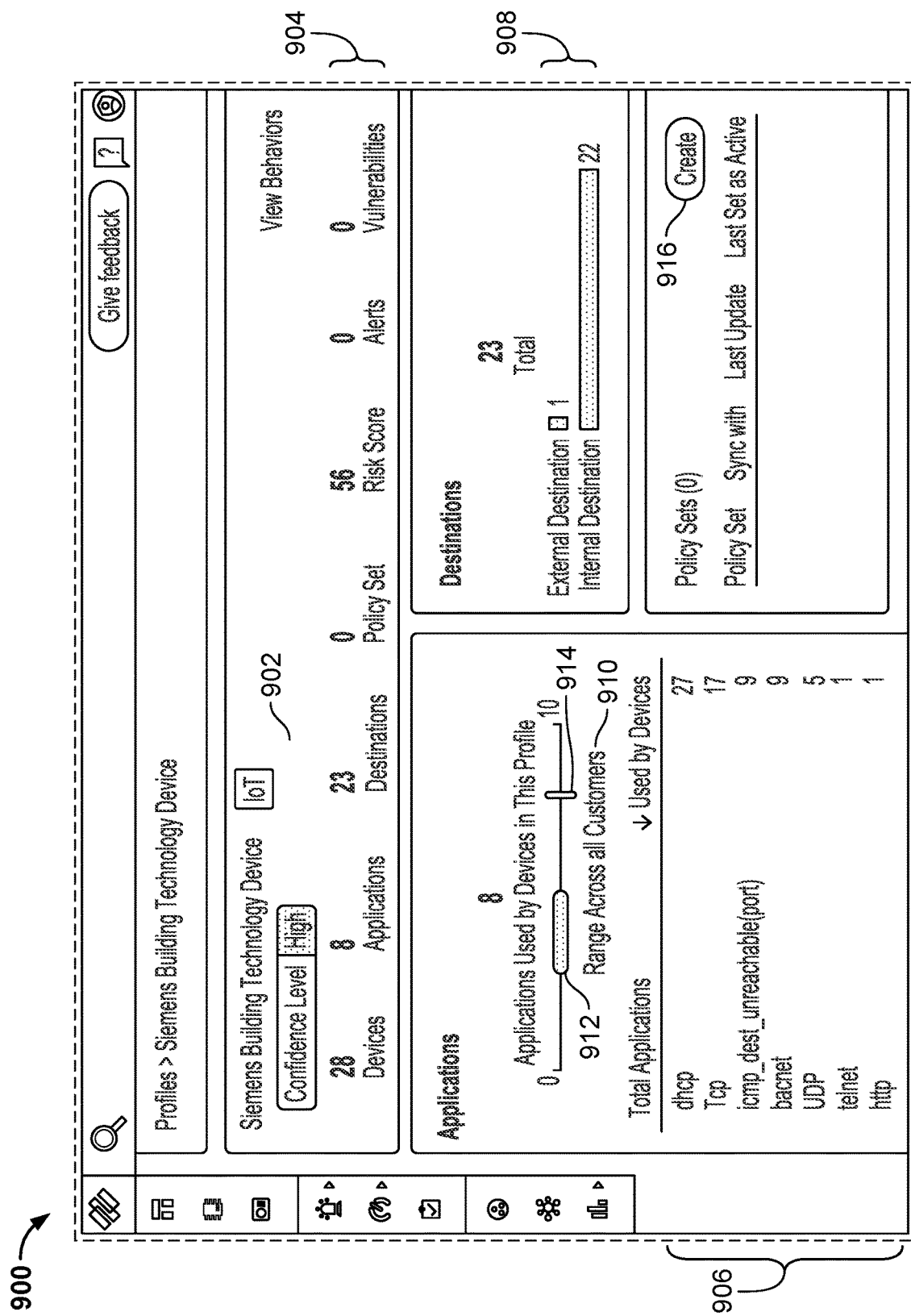

If Charlie clicks on link 804, he will be taken to the interface shown in FIG. 9. Region 902 indicates that security platform 140 has identified the 28 new devices as matching a Siemens Building Technology Device profile with high confidence. Behavioral information that has been collected about the 28 devices while operating within the Acme environment is also shown, summarized in region 904. Collectively, the 28 devices run eight applications in the Acme environment, communicate with 23 destinations (22 within Acme and one outside), and currently have a risk score of 56. A count of how many of the 28 devices are using each application within the Acme environment is shown in region 906, and whether the destinations are internal or external is shown in region 908. Included in region 910 is a comparison of the number of applications used by the Siemens Building Technology Device devices in the Acme environment as contrasted to how those devices (sharing the same Siemens Building Technology Device profile) behave across the environments of other customers of security platform 140. As indicated in region 910, a typical customer deployment of Siemens Building Technology Devices uses three to five applications (912), making Acme's deployment outside of the typical range (914). If Charlie hovers his cursor over region 912, he will be presented with a box that provides additional information about the comparison, such as:

"8 different applications were used by devices in this profile. Based on data from all IoT security customers, the minimum number of applications used was 3, the average was 3, and the maximum was 5. Application usage by your Siemens Building Technology Device devices was higher than usual. Review the application list."

Charlie can review the application list by scrolling further down interface 900. As shown in FIG. 10, Charlie is reviewing use by the badge reader devices of the "dhcp" and "bacnet" applications after such scrolling. The "usage" designation (1002) indicates the frequency of network usage patterns (device profile+application+URL (e.g., "www.siemens.com/update")) and/or destination profile (e.g., "PACS server") for the IoT devices sharing the profile. In various embodiments, the usage for each application is generated based on one month of initially collected traffic. Charlie can use the usage information in determining whether he would like to allow or block certain behaviors. For example, he could learn that, given bacnet is infrequently used, it should only be allowed with internal domains, or only allowed to predetermined external domains (e.g., based on his knowledge of Acme's environment).

If Charlie clicks on region 916 of interface 900, he will be presented with two options for creating a set of policies that can be applied to the badge reader devices. As previously mentioned, Charlie can create his own policy set(s) for the badge reader devices manually (e.g., by interacting with various elements of an embodiment of interface 900). Charlie can also elect to load a recommended policy set that security platform 140 has generated using baseline/other information obtained from the environments of other customers of security platform 140. Once clicking region 916 and opting to use a recommended policy set (if available), security platform 140 will enumerate any available recommended policy sets and Charlie is able to download/apply them to the Acme environment, with the ability to refine/adjust the policies as applicable (e.g., by interacting with various functionality provided by interface 800.

Figure 11:
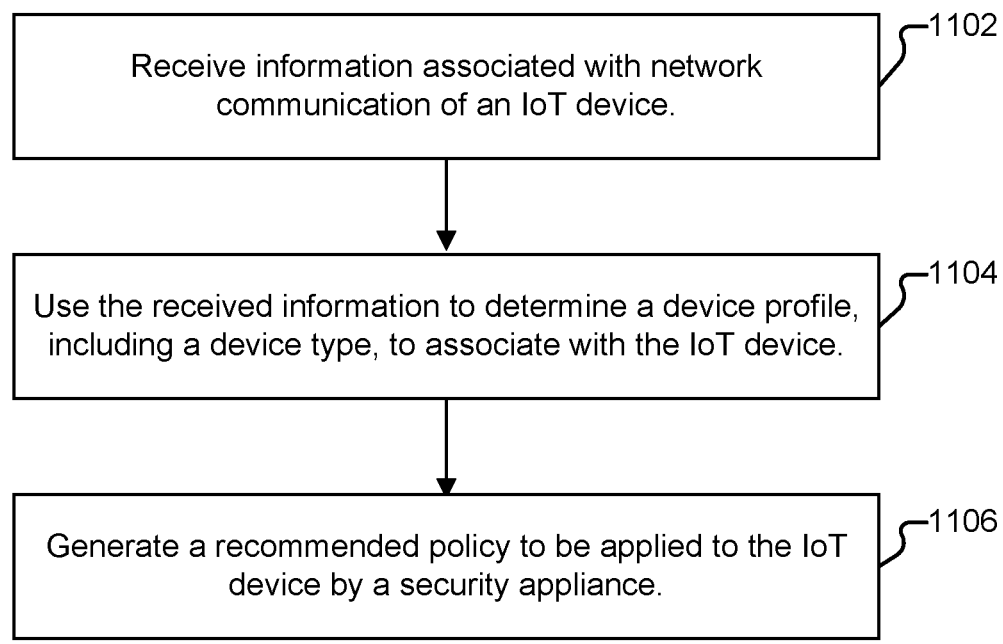
FIG. 11 illustrates an example of a process for generating a policy to apply to a communication involving an IoT device.

FIG. 11 illustrates an example of a process for generating a policy to apply to a communication involving an IoT device. In various embodiments, process 1100 is performed by security platform 140. Process 1100 can also be performed by other systems as applicable (e.g., a system collocated on-premise with IoT devices). Process 1100 begins at 1102 when information associated with a network communication of an IoT device is received. As one example, such information is received by security platform 140 when data appliance 102 transmits to it a device discovery event for a given IoT device (e.g., a badge reader device). At 1104, the received information is used to determine a device profile to associate with the IoT device. As an example, a determination is made that the IoT device is a Siemens SIMATEC RF10000 device, having a particular serial/MAC address, a particular IP address, etc. In this example, the determined "device type" could be "Siemens Building Technology Device." Device types (e.g., badge reader device) and device profiles (e.g., Siemens Building Technology Device) are generally referred to interchangeably in this section. However, multiple profiles can be created for a given device type (e.g., Siemens Building Technology Device devices located in a research area of Acme vs. a retail area of Acme), and a given profile can include multiple device types as applicable (e.g., the Siemens Building Technology Device profile can include badge reader devices and motion trigger sensors). Finally, at 1106, a recommended policy to be applied to the IoT device by a security appliance is generated. As one example, instead of allowing access to all eight of the applications shown in FIG. 9, security appliance 140 could recommend a policy set that allows only the three most commonly used badge reader applications (or five most commonly used badge reader applications) corresponding to the information shown in region 910. If, once downloading and applying the recommended policy, Charlie needs to make adjustments (e.g., whitelist bacnet) to the recommended set, he can do so (e.g., by interacting with an "edit" option provided by interface 800).

VII. IOT Device Identification with Packet Flow Behavior Machine Learning Model

A. Introduction

As described above, packet inspection, such as examining packet headers and/or examining payloads to perform content based pattern or signature matches, can provide helpful information when attempting to identify/classify a device, such as an IoT device. Such packet and content information will often include items such as organizationally unique identifiers (OUIs), source/destination ports, hostnames, application IDs, special destinations, user agent strings, DHCP fingerprint and DHCP vendor class identifiers, etc. Unfortunately, some devices can be difficult to identify through packet analysis. The following are six examples of such types of devices:

An endpoint device for which OUI information is not available.

Devices of multiple types which share a single OUI (e.g., X-ray machines and ultrasound machines all using wireless cards having the same OUI).

Devices whose identities are discovered but corresponding classification rules are challenging to define (e.g., an X-ray machine that is discovered because other devices in the same subnet are also X-ray machines with similar traffic patterns or have similar hostnames, or is discovered because it communicates with a server whose name suggests that the client is the X-ray machine).

Devices with encrypted traffic (that can make signature based classification difficult).

Devices behind network appliances (e.g., routers or switches) where the device's MAC appears to be the router/switch interface's MAC, not the device's MAC.

Devices without hostnames (where existing identification rules often use a combination of a hostname and an OUI as an identification/classification rule).

In various embodiments, device identification/classification techniques described above are supplemented/complemented by deploying one or more machine learning models that make use of packet behavior information. Examples of such packet behavior information (described in more detail below) include: sequences of packet length (SPLN), sequences of packet inter-arrival time (SPIT), and Transport Layer Security (TLS) information, all of which can be used as features. In various embodiments, logistic regression is used to train a data set and the coefficients in the logistic regression can be used as a behavior signature for a device (which can then be used to identify/help identify the device). Returning to FIG. 2F, in various embodiments, a training stage is performed by training module 241 using labeled events provided to aggregation module 238 for feature extraction and training. Trained models can be saved for later use, e.g., by analytics module 242. During production/operation, events (e.g., as initially provided by data appliance 102 and processed by various components of IoT module 138) will similarly pass through aggregation module 238 and into analytics module 242, which will use the trained models to perform device identification on aggregated events (e.g., during inline analytics by analytics engine 272 as examples of binary/multi-class classifiers 282). As applicable (e.g., as new information is received about new types of devices), training module 241 can retrain existing models/create new models.

The techniques described herein are particularly well suited to an environment, such as is shown in FIG. 1, where one or more data appliances (e.g., data appliances 102, 136, and 148) are present and used to help enforce security policies, in part because such data appliances can maintain session control blocks for each session, and the session control blocks will have the metadata/other information that machine learning models described herein will use. Further, if an existing data appliance does not support a particular feature extraction (e.g., sequence of packet lengths, sequence of packet inter-arrival time, and/or verbose TLS information), adding such functionality can be done efficiently, keeping overhead to a minimum.

B. Examples of Packet Behavior Information

The following are examples of features (associated with packet behavior parameters) that can be used to train one or more machine learning models and used, for example, along with other models (e.g., as described above) either individually or in combination to help identify/classify devices such as IoT devices. The following example features can be combined with (if available) other features, such as metadata information associated with a packet (e.g., OUI, destination port, application ID, protocol, outgoing packet count, and outgoing packet byte count).

In an example embodiment, logistic regression is used (based on linear regression), where the result of the logistic regression is a probability which can be used as a confidence level for a device identification. An example formula of the logistic regression is as follows: $p = 1/1 + b^{-(\beta_0 + \beta_1 x_1 + \beta_2 x_2 + \ldots + \beta_m x_m)}$ where usually b=e. Features are extracted from packet flows during sessions and can be used for both training models and, subsequently, for device identification by employing those resulting trained models. The resulting models will generate co-efficients for each feature. Sets of such co-efficients can be used (and are referred to herein) as behavior signatures for devices.

Other types of classifiers can also be used in accordance with techniques described herein (including by using the features described herein), such as a Gaussian naïve Bayes, K nearest neighbor, decision tree, random forest, and/or vector machine.

1. Sequence of Packet Length (SPLN)

A sequence of packet length (SPLN) can be obtained for a given flow, for example, by determining the length of the first ten (or other appropriate number of) non-zero packet length packets (payload) of the flow. If a given packet in the sequence has a zero length payload, that packet can be skipped and the next packet length examined (until the requisite ten or other amount of non-zero packet lengths are considered). In the event a given flow has fewer than the total number of non-zero packet lengths (e.g., the entire flow is only seven non-zero length packets), the SPLN can be padded with zeros at the end to reach the configured number of packet lengths (e.g., ten).

2. Sequence of Packet Inter-Arrival Time (SPIT)

Figure 12:
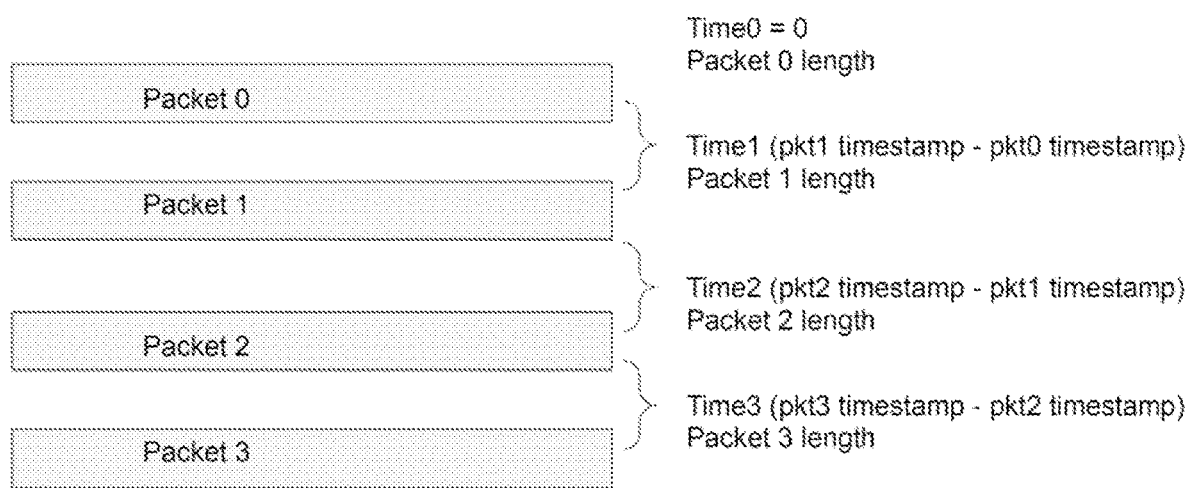
FIG. 12 illustrates a sequence of packet inter-arrival times.

FIG. 12 illustrates a sequence of packet inter-arrival times (SPITs). As shown, "Time1" represents the time between when a first packet (Packet 0) and a second packet (Packet 1) is received. "Time 2" represents the time between when the second packet and a third packet (Packet 2) is received, and so on. As with the SPLN described above, in some embodiments, SPITs are only determined for non-zero length packets. If, for example, Packet 2 as illustrated in FIG. 12 has a zero length payload, the delta between the times at which Packet 3 and Packet 1 are received is used (and a total of ten or other appropriate number of packet inter-arrival times is determined between the first eleven or other appropriate number of non-zero length packets).

3. Transport Layer Security (TLS)

When a device (e.g., an IoT device) engages in an encrypted traffic session, the first portion of the session will be a handshake in the clear. Information from that handshake can be captured and information about the handshake extracted. Examples of such information include: TLS version, an ordered list of offered ciphersuites (e.g., in the client hello message), list of supported TLS extensions (also, e.g., in the client hello message), selected ciphersuites (e.g., in the server hello reply message), selected TLS extensions (also, e.g., in the server hello reply message), and public key length. As with the aforementioned packet metadata, SPLN, and SPIT information, TLS information can be used as a feature in determining a packet behavior signature.

C. Example—SampleCo Smart Meter

The following is a simplified example of using techniques described herein to train (e.g., via training module 241) a model to recognize SampleCo brand Smart Meters (e.g., water meters that collect data on how much water is used, and when, and transmit the collected data to a network for billing, e.g., by a water company). The SampleCo Smart Meters exhibit various characteristics, such as by communicating over NTP, TCP, and FTP both internally (over an intranet) and externally (e.g., to an external server).

Positive and negative training data (with respect to SampleCo Smart Meters) is collected and provided to training module 241 (e.g., by a researcher). An example of such data is shown in FIG. 13A. In the example shown, a total of ten training samples has been provided (numbered 0-9, respectively). Column 1302 indicates whether a given sample is a positive sample (indicated with a "1") or a negative sample (indicated with a "0"). Thus, the first five devices are SampleCo Smart Meters, and the last five devices are not. The remaining nine columns (1304) each respectively correspond to a feature. Examples include OUIs (1306), protocol (1308), destination port (1310), packet lengths (1312), and packet timing information (1314). In various embodiments, such sample data can be obtained using one or more python scripts configured to parse traffic flow logs. Examining training data for device 0 (a positive example of a SampleCo Smart Meter), it has an OUI of 6935 and is communicating using protocol 6 (FTP, for example) over port 21. The first three non-zero packets of device 0 were observed to be 21 bytes, 26 bytes, and 22 bytes, respectively. In this example data set, the first packet time (t0) is always zero, and the delta between each time (e.g., t1–t0, etc.) is determined by training module 241. Other forms of data can also be used (e.g., where the deltas are determined by the python script and appear in place of each of the times listed in region 1314).

FIG. 13B illustrates a result of training a model using the dataset shown in FIG. 13A. In particular, the coefficients and intercepts for a model for determining whether traffic corresponds to a SampleCo Smart Meter are depicted. The coefficients/intercepts depicted in FIG. 13B are collectively an example of a behavior signature of a SampleCo Smart Meter device and can be stored (e.g., in database 160 or other appropriate location) for use in subsequent identification of other SampleCo Smart Meter devices (e.g., as they are added to network 110 and their traffic is received by data appliance 102).

Figure 14A:
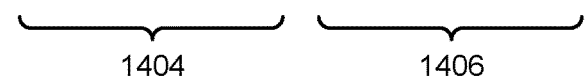
FIG. 14A illustrates two examples of devices matching a device behavior signature.

FIG. 14A illustrates two examples of devices matching a device behavior signature. The two rows depicted in region 1402 correspond to data collected from two respective devices: device 0 and device 1. Both of these devices are SampleCo Smart Meter devices. Region 1404 indicates (for device 0 on the top line and device 1 on the bottom line) the probability that the respective device is not a SampleCo Smart Meter. Region 1406 indicates (for device 0 on the top line and device 1 on the bottom line) the probability that the respective device is a SampleCo Smart Meter. Both devices match the SampleCo Smart Meter device behavior profile with over a 99% probability.

Figure 14B:
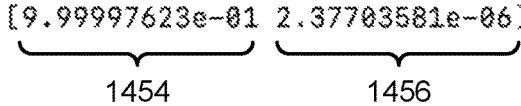
FIG. 14B illustrates two examples of devices not matching a device behavior signature.

FIG. 14B illustrates two examples of devices not matching a device behavior signature. The two rows depicted in region 1452 correspond to data collected from two respective devices: device 0 and device 1. Both of these devices are not SampleCo Smart Meter devices. Region 1454 indicates (for device 0 on the top line and device 1 on the bottom line) the probability that the respective device is not a SampleCo Smart Meter. Region 1456 indicates (for device 0 on the top line and device 1 on the bottom line) the probability that the respective device is a SampleCo Smart Meter. Both devices have a less than 1% probability of being SampleCo Smart Meter devices based on the behavior profile.

D. Process for Performing Device Identification

Models trained using techniques described herein can be used for a variety of purposes. As previously mentioned, one such purpose is efficiently performing inline device identification/classification (e.g., classification performed in real-time as traffic associated with the device is observed on a network). Another such purpose is performing offline analysis (e.g., on pcap or other previously captured network traffic files). In both inline and offline device classification, device dataset and other traffic are used to train a model (e.g., using logistic regression) and generate a set of coefficients for each device. The set of coefficients for each device can be used as a device behavior signature. The set of coefficients can then be fed into a model to use in device identification. Features extracted (whether by a security appliance such as a firewall from live traffic, or from a pcap file) are provided to a device identification engine (e.g., implemented as analytics engine 242 and related elements depicted in FIG. 2G). The device identification engine produces as output a probability that a given device matches a considered device behavior signature. Each possible device behavior signature can be looped through and the one with the highest probability (e.g., subject to a quality threshold) assigned as a classification of the device.

Figure 15:
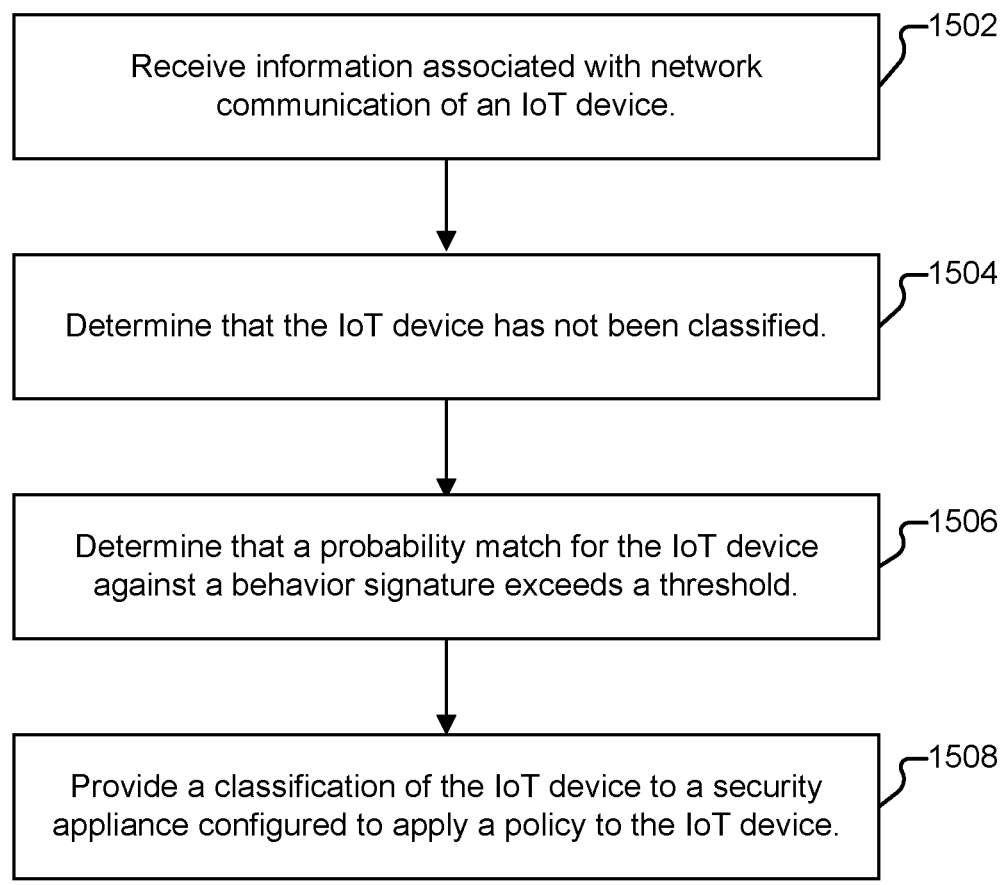
FIG. 15 illustrates an example of a process for classifying an IoT device.

FIG. 15 illustrates an example of a process for classifying an IoT device. In various embodiments, process 1500 is performed by security platform 140. Process 1500 can also be performed by other systems as applicable (e.g., a system collocated on-premise with IoT devices). Process 1500 begins at 1502 when information associated with a network communication of an IoT device is received. As one example, such information is received by security platform 140 when data appliance 102 transmits to it a device discovery event for a given IoT device. At 1504, a determination is made that the device has not been classified (or, as applicable, that a re-classification should be performed). As one example, platform 140 can query database 286 to determine whether or not the device has been classified. At 1506, a comparison against one or more behavior signatures is performed. As an example, as previously mentioned, a variety of different machine-learning and rule/heuristic-based models can be employed by inline analytics engine 272. The models can be applied individually, or (more typically) collectively, with different types of models better at detecting particular kinds of devices. As previously mentioned, in some situations, machine learning models that make use of packet behavior information can be efficient at classifying devices. In various embodiments, at 1506, one or more such models are used to help identify a given IoT device. In particular, at 1506, probability matches against such models are determined. And, if a given device has a probability match that exceeds a threshold against a given packet behavior signature, the device can be classified (e.g., by platform 140) as being of a particular type (e.g., the device type corresponding to the matched profile). Finally, at 1508, the classification of the IoT device (e.g., made at 1506) is provided to a security appliance configured to apply a policy to the IoT device. As mentioned above, this allows for highly fine-grained security policies to be implemented in potentially mission critical environments with minimal administrative effort.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a processor configured to:
receive information associated with a network communication of an Internet of Things (IoT) device;
determine whether the IoT device has previously been classified as being a particular type of IoT device;
in response to determining that the IoT device has not previously been classified as being the particular type of IoT device, determine that a probability match for the IoT device against a behavior signature exceeds a threshold, wherein the behavior signature is generated at least in part by using a machine learning model trained on features extracted from exemplary IoT devices of the particular type, wherein determining the probability match includes using at least one machine learning model trained using packet behavior information, and wherein determining that the probability match exceeds a threshold includes determining that a plurality of signatures are matched above the threshold and selecting a highest ranking match as a result; and
based at least in part on the probability match, provide a classification of the IoT device to a security appliance configured to apply a policy to the IoT device; and
a memory coupled to the processor and configured to provide the processor with instructions.

2. The system of claim 1, wherein the packet behavior information used in training the at least one machine learning model includes sequence of packet length information.

3. The system of claim 1, wherein the packet behavior information used in training the at least one machine learning model includes sequence of packet inter-arrival time information.

4. The system of claim 1, wherein the packet behavior information used in training the at least one machine learning model includes transport layer security (TLS) information.

5. The system of claim 1, wherein an organizationally unique identifier (OUI) for the IoT device is not available.

6. The system of claim 1, wherein an OUI for the IoT device corresponds to a network card and wherein the IoT device is not a network card.

7. The system of claim 1, wherein an OUI for the IoT device corresponds to a network appliance and wherein the IoT device is not a network appliance.

8. The system of claim 1, wherein at least a portion of the network communication is encrypted.

9. The system of claim 1, wherein a hostname for the IoT device is not available.

10. The system of claim 1, wherein the behavior signature comprises a set of coefficients.

11. The system of claim 1, wherein the probability match is associated with the IoT device being made by a particular vendor.

12. The system of claim 1, wherein the probability match is associated with the IoT device having a particular function.

13. A method, comprising:
receiving information associated with a network communication of an Internet of Things (IoT) device;
determining whether the IoT device has previously been classified as being a particular type of IoT device;
in response to determining that the IoT device has not previously been classified as being the particular type of IoT device, determining that a probability match for the IoT device against a behavior signature exceeds a threshold, wherein the behavior signature is generated at least in part by using a machine learning model trained on features extracted from exemplary IoT devices of the particular type, wherein determining the probability match includes using at least one machine learning model trained using packet behavior information, and wherein determining that the probability match exceeds a threshold includes determining that a plurality of signatures are matched above the threshold and selecting a highest ranking match as a result; and based at least in part on the probability match, providing a classification of the IoT device to a security appliance configured to apply a policy to the IoT device.

14. The method of claim 13, wherein the packet behavior information used in training the at least one machine learning model includes sequence of packet length information.

15. The method of claim 13, wherein the packet behavior information used in training the at least one machine learning model includes sequence of packet inter-arrival time information.

16. The method of claim 13, wherein the packet behavior information used in training the at least one machine learning model includes transport layer security (TLS) information.

17. The method of claim 13, wherein an organizationally unique identifier (OUI) for the IoT device is not available.

18. The method of claim 13, wherein an OUI for the IoT device corresponds to a network card and wherein the IoT device is not a network card.

19. The method of claim 13, wherein an OUI for the IoT device corresponds to a network appliance and wherein the IoT device is not a network appliance.

20. The method of claim 13, wherein at least a portion of the network communication is encrypted.

21. The method of claim 13, wherein a hostname for the IoT device is not available.

22. The method of claim 13, wherein the behavior signature comprises a set of coefficients.

23. The method of claim 13, wherein the probability match is associated with the IoT device being made by a particular vendor.

24. The method of claim 13, wherein the probability match is associated with the IoT device having a particular function.

25. A computer program product embodied in a non-transitory computer readable medium and comprising computer instructions for:

receiving information associated with a network communication of an Internet of Things (IoT) device;

determining whether the IoT device has previously been classified as being a particular type of IoT device;

in response to determining that the IoT device has not previously been classified as being the particular type of IoT device, determining that a probability match for the IoT device against a behavior signature exceeds a threshold, wherein the behavior signature is generated at least in part by using a machine learning model trained on features extracted from exemplary IoT devices of the particular type, wherein determining the probability match includes using at least one machine learning model trained using packet behavior information, and wherein determining that the probability match exceeds a threshold includes determining that a plurality of signatures are matched above the threshold and selecting a highest ranking match as a result; and based at least in part on the probability match, providing a classification of the IoT device to a security appliance configured to apply a policy to the IoT device.

* * * * *

UNITED STATES PATENT AND TRADEMARK OFFICE
CERTIFICATE OF CORRECTION

| | |
|---|---|
| PATENT NO. | : 11,552,975 B1 |
| APPLICATION NO. | : 17/511376 |
| DATED | : January 10, 2023 |
| INVENTOR(S) | : Jialiang Zhang, Ke Tian and Fan Zhang |

It is certified that error appears in the above-identified patent and that said Letters Patent is hereby corrected as shown below:

On the Title Page

In page 3, Column 1, item (56), other publications, cite no. 5, before "Software", delete "an" and insert --on--, therefor.

In page 3, Column 2, item (56), other publications, cite no. 10, before "Internet", delete "an" and insert --on--, therefor.

Signed and Sealed this
Tenth Day of October, 2023

Katherine Kelly Vidal
*Director of the United States Patent and Trademark Office*